(12) United States Patent
McGaffey et al.

(10) Patent No.: US 6,556,982 B1
(45) Date of Patent: Apr. 29, 2003

(54) METHOD AND SYSTEM FOR ANALYZING AND CLASSIFYING ELECTRONIC INFORMATION

(75) Inventors: Robert W. McGaffey, Oak Ridge, TN (US); Michael Allen Bell, Powell, TN (US); Peter J. Kortman, Knoxville, TN (US); Charles H. Wilson, Etowah, TN (US)

(73) Assignee: BWXT Y-12, LLC, Oak Ridge, TN (US)

( * ) Notice: Subject to any disclaimer, the term of this patent is extended or adjusted under 35 U.S.C. 154(b) by 0 days.

(21) Appl. No.: 09/560,471

(22) Filed: Apr. 28, 2000

(51) Int. Cl.[7] .................................................. G06N 5/02
(52) U.S. Cl. .............................. 706/50; 707/3; 707/100; 707/102
(58) Field of Search .............................. 706/50, 45, 46; 707/3, 102, 100

(56) References Cited

U.S. PATENT DOCUMENTS 4,868,733 A * 9/1989 Fujisawa et al. ............... 706/50
6,370,684 B1 * 4/2002 De Pauw et al. ........... 717/128

* cited by examiner

Primary Examiner—Wilbert L. Starks, Jr.
Assistant Examiner—Joseph P. Hirl
(74) Attorney, Agent, or Firm—Kilpatrick Stockton, LLP

(57) ABSTRACT

A data analysis and classification system that reads the electronic information, analyzes the electronic information according to a user-defined set of logical rules, and returns a classification result. The data analysis and classification system may accept any form of computer-readable electronic information. The system creates a hash table wherein each entry of the hash table contains a concept corresponding to a word or phrase which the system has previously encountered. The system creates an object model based on the user-defined logical associations, used for reviewing each concept contained in the electronic information in order to determine whether the electronic information is classified. The data analysis and classification system extracts each concept in turn from the electronic information, locates it in the hash table, and propagates it through the object model. In the event that the system can not find the electronic information token in the hash table, that token is added to a missing terms list. If any rule is satisfied during propagation of the concept through the object model, the electronic information is classified.

50 Claims, 14 Drawing Sheets

LOAD IOVs
STEP 550

METHOD AND SYSTEM FOR ANALYZING AND CLASSIFYING ELECTRONIC INFORMATION

REFERENCE TO GOVERNMENT CONTRACT

This invention was made with Government support under Contract No. DE-AC05-96OR22464 awarded by the U.S. Department of Energy to Lockheed Martin Energy Research Corp. and Contract No. DE-AC05-84OR21400 awarded by the U.S. Department of Energy to Lockheed Martin Energy Systems, Inc., and the Government has certain rights in this invention.

TECHNICAL FIELD

The invention relates generally to the field of information searching and analysis, and more particularly to data for a personal computer.

BACKGROUND OF THE INVENTION

For thousands of years, mankind has kept records. From wall paintings, to stone tablets, to papyrus scrolls, to the illuminated vellum of the Middle Ages, man has always written down those things important to him. These records have been preserved, copied, and elaborated upon through the ages. For many years, however, access to this information was relatively arduous. Public establishments such as libraries might not have the proper documents, or might not have enough copies to satisfy demand, and even when source material is available, finding particular information of value within sizable sources documents requires significant expenditures of time.

With the advent of the computer, information storage and proliferation underwent a quantum increase. Documents could be easily stored in an electronic medium, replicated quickly, and disseminated virtually at will. Information of value can be located in documents via key word searches but, as experience with internet search confirms, getting what you want is still very arduous. Classifying data has become more difficult than ever before; searching through documents for specific words or concepts may resemble the proverbial needle in a haystack. Such searches may also yield little of value if the searcher doesn't already know the right words for which to search.

An application for which this problem is especially acute concerns information flows (e.g., document publications, emails) that require monitoring to assure that sensitive information (e.g., military information or business trade secrets) is not revealed. Manually examining large numbers of documents for sensitive information can be very expensive and prone to human error. State of the art computer-implemented solutions typically employ key-word text searches that are neither very accurate nor fast, because the amount of search time depends on the number of key words. Often the present computer-implemented solutions require more time than the average person to classify (or "declassify") the electronic information.

In the information age, the productivity of knowledge acquisition is a fundamental parameter underlying success. The fundamental problem around which productivity in knowledge acquisition turns is "how to quickly and accurately find information of value." There is a general need in the art for a data classification system that analyzes and sorts data rapidly and accurately. In this context, "classification" refers to the discovery of "information of value" (IOV) in the data. This IOV may be text, bitmaps, sound files, or any other uniquely identifiable data.

SUMMARY OF THE INVENTION

Generally stated, the present invention is computer-implemented data analysis and classification system. The data analysis and classification system reads and analyzes data for the presence of IOV. IOV are concepts or associations of concepts in the form of words, alphanumeric expressions, or any other data that represent knowledge that is determined to be valuable. This IOV and the network of concepts related to it form an enterprise concept network (ECN). The ECN consists of (1) a set of concepts that represent a particular enterprise (i.e., a particular knowledge domain) and (2) a set of relationships between these concepts that enable IOV to be identified. In various embodiments, the ECN may be constituted with entirely different concepts and interrelationships. For example, one ECN might represent the knowledge domain related to nuclear materials, while another may characterize the knowledge domain associated with toxic waste. In this latter case, regulations related to toxic waste management might constitute IOV. Once the data analysis is completed, the data analysis and classification system returns a report on the field of data analyzed.

The data analysis and classification system identifies IOV in electronic information through the use of a hash table and an object model. This object model, which embodies the ECN, is referred to as the "active concept network" (ACN). Initially, the system retrieves a dictionary file storing a set of concepts. Concepts may be alphanumeric characters, such as words or phrases, or any other uniquely identifiable data that the system has previously encountered and is able to process. The data analysis and classification system then creates a hash table, placing each concept into the table.

Once the data analysis and classification system generates a hash table and places the concepts comprising the dictionary list into the hash table, relationships are created that define how objects interact within the ACN. Two types of relationships may exist within the ACN: first, operational relationships, which refer to logical connections, such as equivalency or implication; and second, output relationships, which specify what type of output is appropriate inside a given application. After creating the ACN, the data analysis and classification system then reads data, breaks the data down into component concepts and traces the relationships for each concept through the ACN. The system activates all relationships, both operational and output, pertaining to a given concept. This process is referred to as "propagation." If any concept propagation contains an output relationship, then appropriate output occurs.

The invention improves over the drawbacks of prior document classification systems and accomplishes the advantages described above. This will become apparent from the following detailed description of the embodiments and the appended drawings and claims.

DETAILED DESCRIPTION

General Summary of the Embodiment

Figure 1:
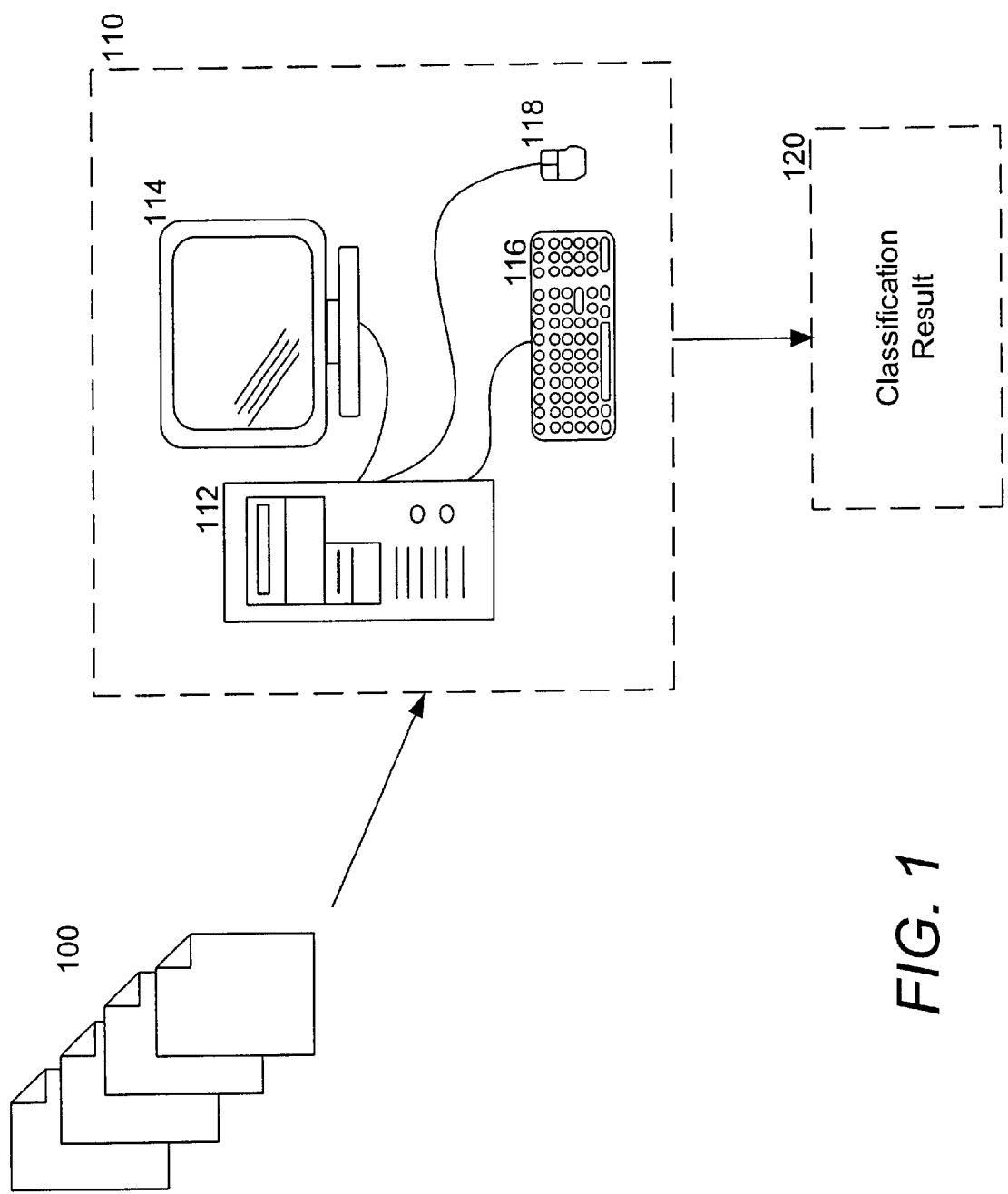
FIG. 1 is a block diagram of a personal computer that provides an exemplary operating environment for an embodiment of the present invention.

The present invention may be embodied in a data analysis and classification system that reads and parses data, and retrieves IOV by applying a set of expert-defined relationships to the data. The data may be stored in any computer-readable format, including but not limited to ASCII text, hypertext (HTML), various word-processing formats, scanned documents which have undergone optical character recognition, JPEG files, and so on. The data analysis and classification system is typically implemented as an application program on a personal computer, but may comprise a portion of an application suite, a program run across a distributed computing network, a sub-routine in a larger program, or a program run on a mini-, micro- or other computing device, including handheld devices. It may be segmented across a distributed computer network, Internet, or intranet, with a first module resident on a server system, and one or more applications acting as clients on remote machines.

Moreover, while the embodiment described here is written in JAVA, the data analysis and classification system is independent of language and may be written in C++, FORTRAN, machine language or any other language.

Initially, the data analysis and classification system creates a knowledge base comprised of all data previously defined and processed. This data is stored in a dictionary file. The dictionary file is typically implemented as a hash table, although the dictionary file is independent of the data analysis and classification system and may take different forms in alternate embodiments. For example, the dictionary file may be implemented as binary search table, AVL tree, and so on.

Next, the data analysis and classification system establishes an object model. The object model is also referred to as an active concept network or "ACN." The ACN reflects relationships established between various concepts. Examples of common relationships include the EQUIV relationship, wherein one concept is equivalent to another; the IMPLIES relationship, wherein the presence of one concept implies the existence of another concept; and the CIMPLIES (co-implies) relationship, wherein several concepts must be present within a defined scope or distance within the data in order to imply another concept. Other embodiments of this invention may include implications that carry probabilities with them. For example, the concepts "clouds", and "sun" may imply the concept "sky" ninety percent of the time, thus, yielding a ninety-percent confidence level. Additional custom relationships may be defined by a system user as necessary, and are not limited to those expressly disclosed. Further, output relationships that specify when and how reports of IOV are made are included in the object model. Other types of relationships may be developed and are considered to be a part of the invention, such as user-defined queries that create a relationship on the fly that the invention must now consider as it reads data.

Once the data analysis and classification system (DACS) creates the hash table and the ACN, the system may begin retrieving IOV. The data analysis and classification system performs this operation by reading in each word or concept individually from an input file. Next, hyphenated words are connected into single words if possible. Then, words separated by spaces are checked to see if the combination equates to an IOV concept. For example, the words "calcium" and "oxide" should be processed as the phrase "calcium-oxide" rather than the two separate words. At this point, all of the unjoined words and phrases are treated as concepts. Next, the DACS determines whether the current concept is present in the ACN, and if so, tracing the concept's relationships. In the event that the system cannot locate a concept in the ACN, then that concept is added to a missing terms list for later review by the programmer. Although the present embodiment analyzes an entire document and presents a user with a missing terms list once the document has been classified, alternate embodiments may allow the user to edit the missing terms during processing to allow error correction on the fly.

Throughout this specification examples may be used referring to redacting sensitive documents. However, the present invention may be used in many additional ways, without modification, that will be apparent to those skilled in the art. For example, the invention may also be used to search through a document set and retrieve only those documents that contain specific concepts, or a series of concepts relating to a specific topic. Further, the invention is not limited to classifying entire documents. Alternate embodiments may permit selective redaction of sensitive portions of the electronic information, or records in a database, including image or sound data.

The data analysis and classification system is very adaptable and is capable of taking other forms. For example, the DACS input could consist of user-generated queries rather than the input of text or data. The IOV being sought may additionally already be present in the ACN. For example, a user may ask a question of the system in respect to the diseases of Dogwood trees, such as "Why are the leaves of my Dogwood wrinkled and dry?" The system might know the three different problems—ranging from lack of water to specific diseases—that could account for the described condition. The system may also know that these three problems were distinguished from each other by one defining characteristic, and in turn could query the user until two of the three concepts were eliminated, thus leaving an output concept that explained what the problem was to the user.

Exemplary Operating Environment

FIG. 1 and the following discussion are intended to provide a brief commentary and description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, and so on that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in a distributed computing environment where tasks are performed by remote processing devices linked through a communications network. In a distributed computing environment, program models may be located in both local and remote memory storage devices.

With reference to FIG. 1, an exemplary system for implementing the present invention includes a conventional personal computer system 110, including a CPU-based personal computer 112, a monitor 114, a keyboard 116, and a mouse 118. The computer system 110 receives electronic information 100 in the form of a text document, graphic image, digitized sound recording, or other computer readable file. Examples of additional electronic formats that may be processed by the computer system 110 include a word processor file, an HTML file, a binary file, a .gif graphic image, a .wav sound file, and others that will occur to those of ordinary skill in the art.

The personal computer 112 processes the electronic information 100 according to a set relationships. These relationships will be further discussed with respect to FIGS. 3 through 5. Briefly stated, the relationships pertaining to a specific electronic information 100 set forth a ACN by which the document is classified. Each word, phrase, line, or other text string in the electronic information 100 is parsed and converted into a concept. The system traces all the relationships for each concept. If IOV is found, a report is issued indicating that the electronic information contains sensitive information. Note that a combination of two or more concepts may also indicate IOV. Once the system has traced the relationships for all the concepts through the ACN, the computer system 110 generates a report 120 for the electronic information. The report 120 indicates whether the electronic information 100 is classified, and for what reasons. The ACN will be more fully discussed with respect to FIG. 3.

Operation of the Data Analysis and Classification System

Figure 2:
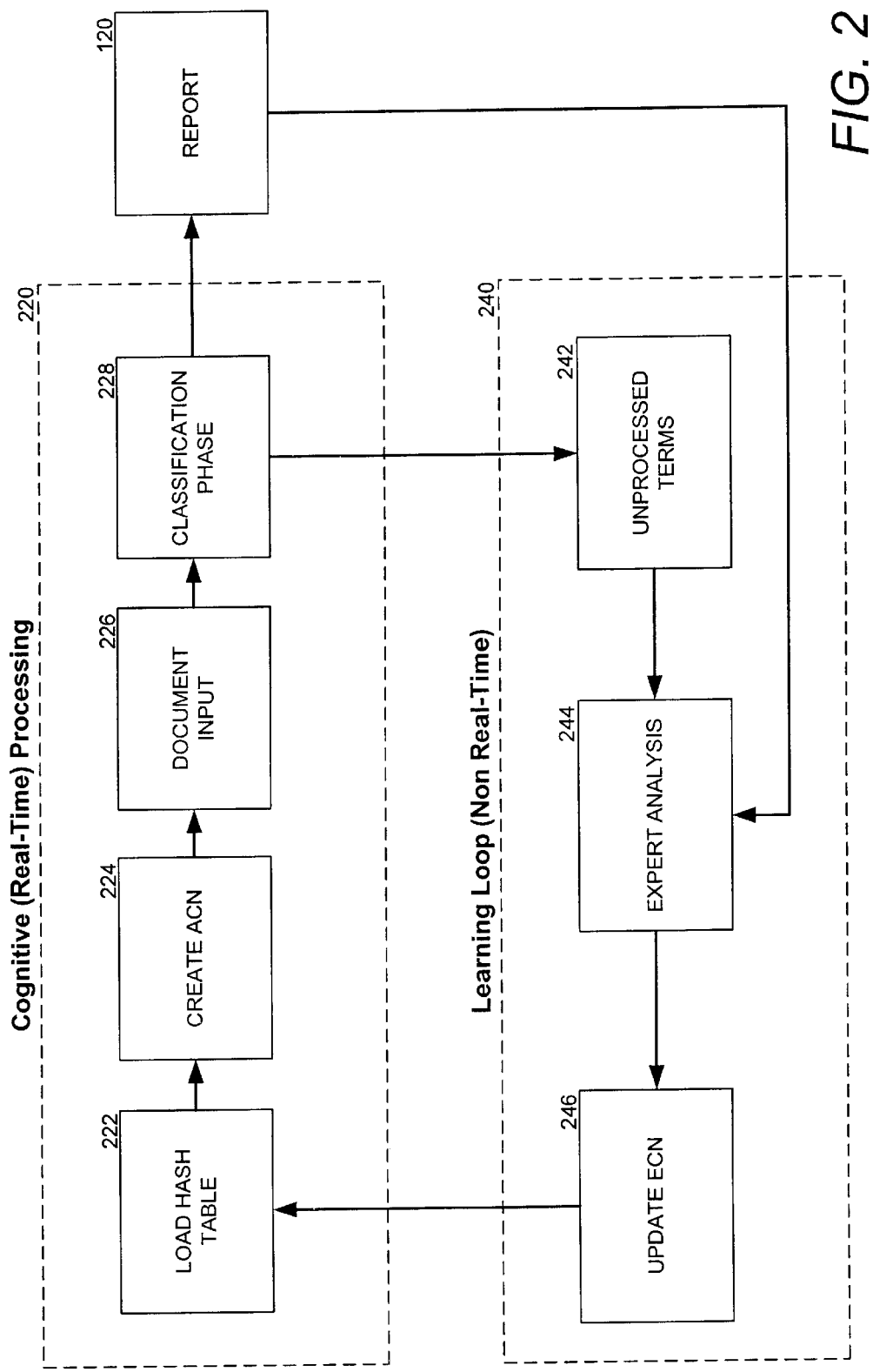
FIG. 2 is a block diagram showing the main processing loop of the current invention.

FIG. 2 is a block diagram of the data analysis and classification system 200. This system operates in two modes: a cognitive (or real-time) processing mode 220 and a learning loop (or non real-time) processing mode 240. Put another way, the data analysis and classification system performs the steps displayed in the cognitive processing mode 220 directly, while a human expert or team of human experts performs the steps comprising the learning loop 240.

The cognitive processing loop 220 comprises four steps. First, the data analysis and classification system reads a dictionary file of all known terms and creates a hash table in step 222. The hash table creation process will be discussed in the portion of the specification entitled "The Knowledge Base."

Second, in step 224 the data analysis and classification system reads the list of all relationships and connects them to form the ACN by applying the relationships, both logical and output to the concepts located within the hash table. The various relationships recognized by the ACN are discussed shortly.

Third, the data analysis and classification system reads electronic information 100 and parses it into its component concepts in the electronic information input phase 226. Once the data analysis and classification system has executed the classification phase 228, the data analysis and classification system generates a report 120. Following the report generation, the cognitive processing loop 220 terminates.

In step 224, the data analysis and classification system recognizes three types of logical relationships, detailed below.

The EQUIV (a=b) relationship equates one concept with another. That is, two concepts observing an EQUIV relationship are logically equivalent to one another. For example, if an EQUIV relationship defines the concept "cat" as equivalent to the concept "kitten", then the data analysis and classification system assigns both the same object in the ACN. Furthermore, any number of concepts may be equated by using a set of EQUIV relationships, all of which would share the same object. By this method, any implications that apply to the first concept automatically apply to any others sharing the same object. For example, if the data analysis and classification system recognizes one concept as IOV, then the other equivalent concept(s) will also be recognized as IOV.

The second type of relationship recognized by the data analysis and classification system is an IMPLIES (p ⊃ q) relationship. This is the logical equivalent of "if p then q." Thus, if concept p is recognized in the ACN, its concept q in the ACN is notified such that all relationships of p obtain in respect to q. For example, if in the concept "chili powder", as implemented in the ACN, implies "Mexican recipe", and if the phrase "chili powder" is encountered in the electronic information, then the object "chili powder" notifies its observer, the object "Mexican recipe", which in turn notifies all its observers. However, if "Mexican recipe" is encountered, "chili powder" is not notified unless the "Mexican recipe" object contains a reference to "chili powder".

CIMPLIES (p & q & r ⊃ s) refers to a IMPLIES relationship where the terms in the antecedent (if) are conjoined. (If p AND q AND r . . . THEN s). For example, the presence of three concepts within the same electronic information implies the presence of a fourth concept. A sample CIMPLIES relationship might be that if the concepts "cloud," "blue," and "sun" are all present in the same paragraph, then the concept "sky" is implied. The data analysis and classification system uses CIMPLIES to find IOV in electronic information that does not contain a specific concept identified as IOV but contains multiple conditions implying such a concept, as in the example above.

Those skilled in the art will recognize that there are other relationships that may be implemented that are also part of the invention. For example, the AND THEN relationship between two concepts implies not just the two concepts being present, but the order of the concepts is important. Alternate embodiments may include additional relationships, such as the OR relationship or the NOT relationship, etc.

An output relationship differs from a logical relationship in that an output relationship generates a reports rather than notifying other ACN observers. An output relationship may have multiple concepts conjoined in its definition, but an output relationship is always a single object whose sole purpose is to generate a report. In the data analysis and classification system's present embodiment as a classification program, an output relationship returns IOV by a report, if and only if the data analysis and classification system recognizes an output relationship in its analysis of electronic information 100. For example, if the concept "cat" is an IOV concept, and "cat" is present in the electronic information, a report will be generated. This differs from the "kitten" EQUIV "cat" relationship in that the EQUIV relationship does not act to return IOV as a report about electronic information 100, but instead only associates two concepts with each other. Continuing with this example, the aforementioned output relationship would also return a report if the EQUIV relationship described above is present and the electronic information contains the concept "kitten." Furthermore, output relationships may require the presence of more than one concept to return a report and may even exclude (using the NOT relationship) certain concepts in order to identify the IOV.

After the data analysis and classification system has executed the classification phase 228, the data analysis and classification completes the cognitive processing loop 220, the learning loop 240 is entered. In the learning loop 240 a human expert updates the data analysis and classification system's dictionary file and relationship set (the set of all relationships structuring the ACN) in a non-real-time fashion. Initially, an expert must review the unprocessed terms list 242 (if any) and enter these into the dictionary file in order to insure that all concepts are processed in the future by the cognitive processing loop 220. Once the expert enters any unprocessed concepts into the ACN as part of the unprocessed terms phase 242, he may review the performance of the data analysis and classification system in the expert analysis phase 244.

In the expert analysis phase 244, the human expert may critique the performance of the data analysis and classification system by reviewing the report 120. Essentially, the expert double-checks the results generated by the data analysis and classification system, and independently determines whether the IOV report is correct. If the expert agrees with the data analysis and classification system's interpretation result 120 in the expert analysis phase 244, then the learning loop 240 ends. Otherwise, the expert may update the data analysis and classification system in the update phase 246 by instituting new relationships. The data analysis and classification system will apply these new relationships the next time it attempts to process electronic information 100.

An Expanded View of the Analysis Engine

Figure 3:
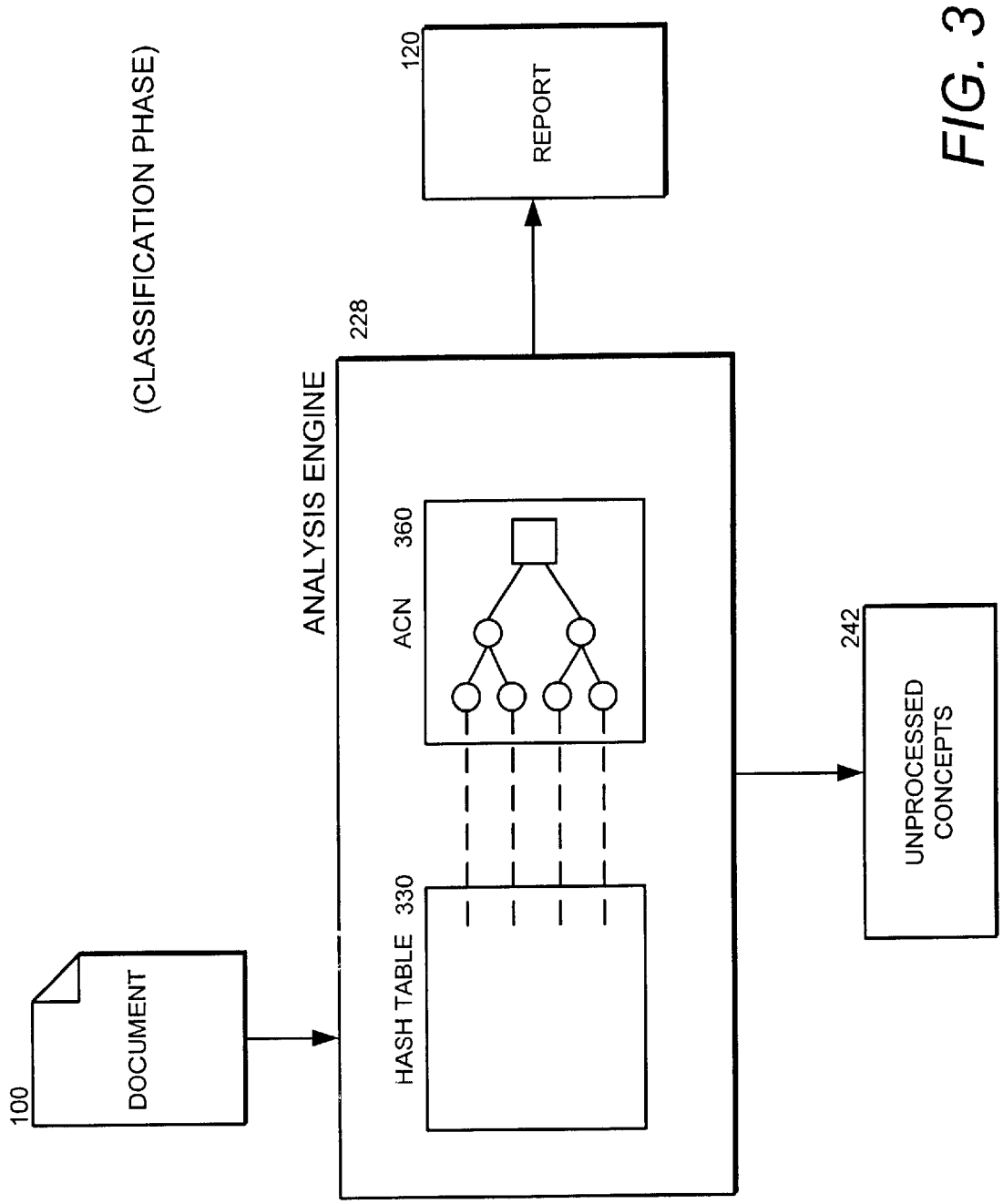
FIG. 3 is a block diagram showing the software architecture of the data analysis and classification system.

Turning now to FIG. 3, an expanded view of the Analysis Engine is shown. During the classification phase 228, the data analysis and classification system 220 determines whether each concept comprising the electronic information 100 undergoing analysis is present in the hash table 330. If the data analysis and classification system finds the concept within the hash table 330, and if that concept implies other concepts, all such implications are made, whether those implications are direct or indirect. Additionally, if any such implications then cause any of the CIMPLIES relationships to be notified, the CIMPLIES is checked; and if the all necessary concepts within the CIMPLIES are satisfied (including any scope requirements), all implications that follow the CIMPLIES are also made. A "scope" requirement refers to how close together the concepts must be in the electronic information 100 to trigger notification, e.g. the words "blue," "cloud", and "sun" imply "sky" only if they are found within the same paragraph. In the event that the concept is not present within the hash table 330, the data analysis and classification system stores the concept as part of a list of unprocessed concepts 242.

With respect to FIG. 3, electronic information 100 enters the analysis engine 228 that in turn reads a set of concepts from the electronic information. The analysis engine 228 checks for the presence of a concept in the hash table 330. If a concept is not present in the hash table, then the concept is added to the unprocessed terms list 242. If the analysis engine 228 locates a term entry in the hash table 330 corresponding to a concept from the electronic information 100, it tells the object created during phase 224. The system then traces all relationships applying to that object. Thus, the system traces all relationships for each concept retrieved from the electronic information 100 present in the hash table 330. Thus, only previously known or defined concepts are traced; unknown concepts are added to the unprocessed terms list 242.

As the analysis engine 228 traces the inferences of each concept through the ACN 360, it monitors the IOV objects to determine whether a "hit" occurs. A hit occurs when all conditions of an IOV object are satisfied. For example, an IOV object may call for two concepts to be present within the electronic information. If both concepts are found within the electronic information 100, then the rule is satisfied and a hit is created. If the analysis engine detects a hit in the ACN 360, then it classifies the electronic information 100. Once all the inferences of all the concepts within the electronic information 100 are traced through the ACN 360 by the analysis engine 228, the engine generates a classification result 120. If the propagation within the electronic information 100 through the ACN 860 results in no hits (no rules have been satisfied), then the analysis engine 228 generates an "unclassified" classification result 120.

All CIMPLIES and IOV objects are scope dependent. Sample distances may be within the same sentence, paragraph, document and so on. In order to accommodate scoping requirements, the analysis engine 228 continually looks for the end of each sentence, paragraph, and document. The analysis engine 228 passes these parameters, called the scoping parameters, to the ACN 360 in order to insure that no scope dependent concept or object is incorrectly triggered, generating an inaccurate classification result 120.

The Knowledge Base

When processing the electronic information 100, the data analysis and classification system 220 retrieves each individual concept from electronic information 100, and looks for the presence of the concept in the hash table 330. If there is no entry corresponding to the concept, then the concept is placed in a unprocessed terms list 242 and the electronic information 100 analysis continues. If the concept is present in the hash table, then the data analysis and classification system 220 applies any inferences due to the concept and its relationships.

The hash table 330 returns one of three results to the system. The first indicates that the concept is not in the hash table 330 at all. That results causes the system to add the concept to the unprocessed terms list 242. The second result returns the location of an object in the ACN 260 that is a special concept called the null concept. The null concept is present in the ACN and is used to indicate that the concepts that refer to it have no relationships with other concepts. Concepts such as "the", "a", "an" etc. generate the null return. The third result is the address of a viable concept. When such a return occurs, that object is notified, and tracing inferences through to ACN 860 occurs.

The ACN

Figure 4:
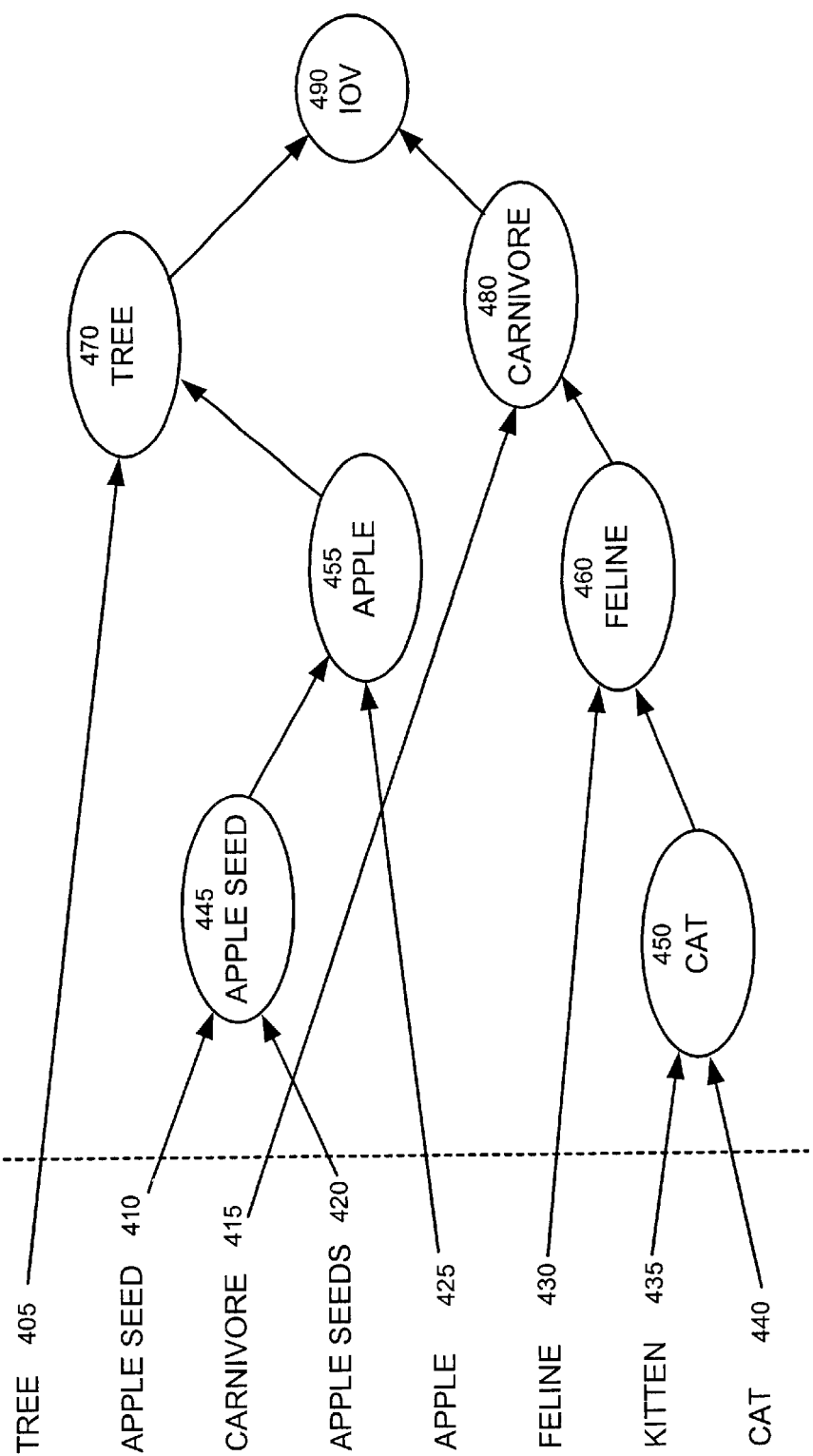
FIG. 4 is a diagram of an active concept network (ACN) constructed by an embodiment of the present invention.

FIG. 4 displays a sample ACN 360. This ACN 360 embodies a series of relationships, as follows:

Relationship: kitten EQUIV cat;
Relationship: cat IMPLIES feline;
Relationship: feline IMPLIES carnivore;
Relationship: apple seed EQUIV apple seeds;
Relationship: apple seed IMPLIES apple;
Relationship: apple IMPLIES tree; and
IOV: carnivore and tree yields hit.

Electronic information 100 consists of patterns and words. Some of those words become phrases. Then both words and phrases become concepts. The hash table 330 entries are made up of concepts. The ACN 360 contains an object for every useful concept. In FIG. 4, the leftmost column represents concepts in the hash table 330, while the elements to the right of the dashed line are the concept objects. For example, the concept "carnivore" 415 is represented within the ACN 360 as object "carnivore" 480. However, the single object "cat" 450 represents both the concept "kitten" 435 and the concept "cat" 440, because the two concepts are defined as logically equivalent by an EQUIV relationship. In the case where two concepts are linked by an EQUIV relationship, a single object is used to represent both. This minimizes both storage space and processing demands on the data analysis and classification system 220.

IOV 490 is an object reflecting the parameters of the underlying concern. In this case, the object represented by IOV 490 registers a hit when both carnivore and tree are located within electronic information 100 and are close enough to each other to satisfy the scope of IOV 490.

The data analysis and classification system 220 processes the electronic information by extracting individual words. An attempt to join hyphenated words is made first. If the joined hyphenated word is in the hash table it is used. As the system reads the electronic information, each word is initially concatenated with the following word by adding a hyphen and creating a single phrase. The data analysis and classification system 220 checks for the presence of the phrase in the hash table 330. If the phrase is not present, then the system checks for the presence of the first constituent word.

An example may serve to illustrate the functioning of the ACN 360. Suppose the ACN 360 comprises the above relationships, and the electronic information 100 consists entirely of the sentence, "My kitten likes to chew on apple seeds." The data analysis and classification system 220 reads the first token of the electronic information (here, "My") and checks for its presence in the hash table 330. Ideally, the hash table contains all of the words in the English language; words that do not affect the classification result 120 simply refer to the null concept object and are ignored by the system.

Continuing with the example, the first token of importance read by the data analysis and classification system 220 is the token "kitten". The system locates "kitten" in the hash table 330, and traces "kitten" through ACN 360. Kitten 435 causes the object "cat" 450 to be notified, the object "cat" 450 notifies the object "feline" 460. The object "feline" 460 notifies object "carnivore" 480. Finally, the object "carnivore" notifies the IOV 490 and one half of IOV 490 is satisfied.

Further continuing the example, the tokens "likes", "to", "play", and "with" are all not viable concepts within the ACN 360. The data analysis and classification system 220 thus finishes processing these concepts once it finds them in the hash table 330 and discovers they refer to the null concept. However, the reference corresponding to the concept "apple seeds" 420 contains a reference to the concept object "apple-seed" 445 in the ACN 360. Once the data analysis and classification system 220 applies the relevant relationships, the end result is that apple seed 445 notifies apple 455 which notifies tree 470 which in turn notifies IOV 490. Since both object "carnivore" 480 and object "tree" 470 are present in the electronic information, IOV 490 is satisfied and the data analysis and classification system 220 registers a hit (provided the scope requirement is met), classifying the electronic information 100.

Creating the ACN

Figure 5:
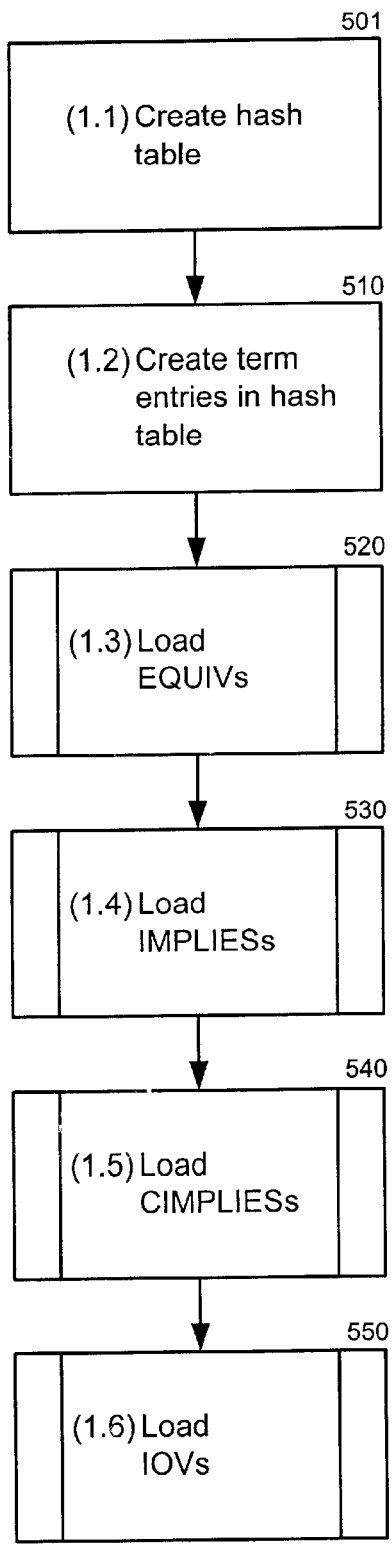
FIG. 5 is a logic flow diagram of a flowchart illustrating a method for creating an ACN.

FIG. 5 displays a flowchart detailing the steps executed when creating a active concept network 360. The logic embodied in FIG. 5 is commonly referred to as the ACN creation routine 500. In step 501, the data analysis and classification system 220 creates a hash table in a manner well known to those skilled in the art.

Once the data analysis and classification system 220 has defined the structure of the hash table it proceeds to step 510. In step 510, the system creates term entries in the hash table. In order to create term entries, the data analysis and classification system 220 reads the dictionary file containing a list of all known concepts into memory. The system then processes each concept individually by inserting the concept into the hash table, and instructing the hash table to return a reference to the null concept object for this concept.

Following the term entry creation in step 510, step 520 is entered. In step 520, data analysis and classification system 220 processes all EQUIV relationships. The system invokes an EQUIV subroutine to carry out this task. The EQUIV subroutine is further discussed with respect to FIG. 6.

Following the execution of the EQUIV subroutine in step 520, the data analysis and classification system executes the IMPLIES subroutine in step 530. The IMPLIES subroutine 530 is further discussed with respect to FIG. 7.

Next, the CIMPLIES subroutine 540 is executed. The CIMPLIES subroutine is more fully depicted in FIG. 8 and will be discussed with respect thereto.

Following the CIMPLIES subroutine 540, the data analysis and classification system 220 executes the IOV subroutine 550. The IOV subroutine will be examined with respect to FIG. 9. After subroutine 550, the electronic information subroutine 226 is entered. The electronic information input subroutine is shown in FIG. 10.

Figure 6:
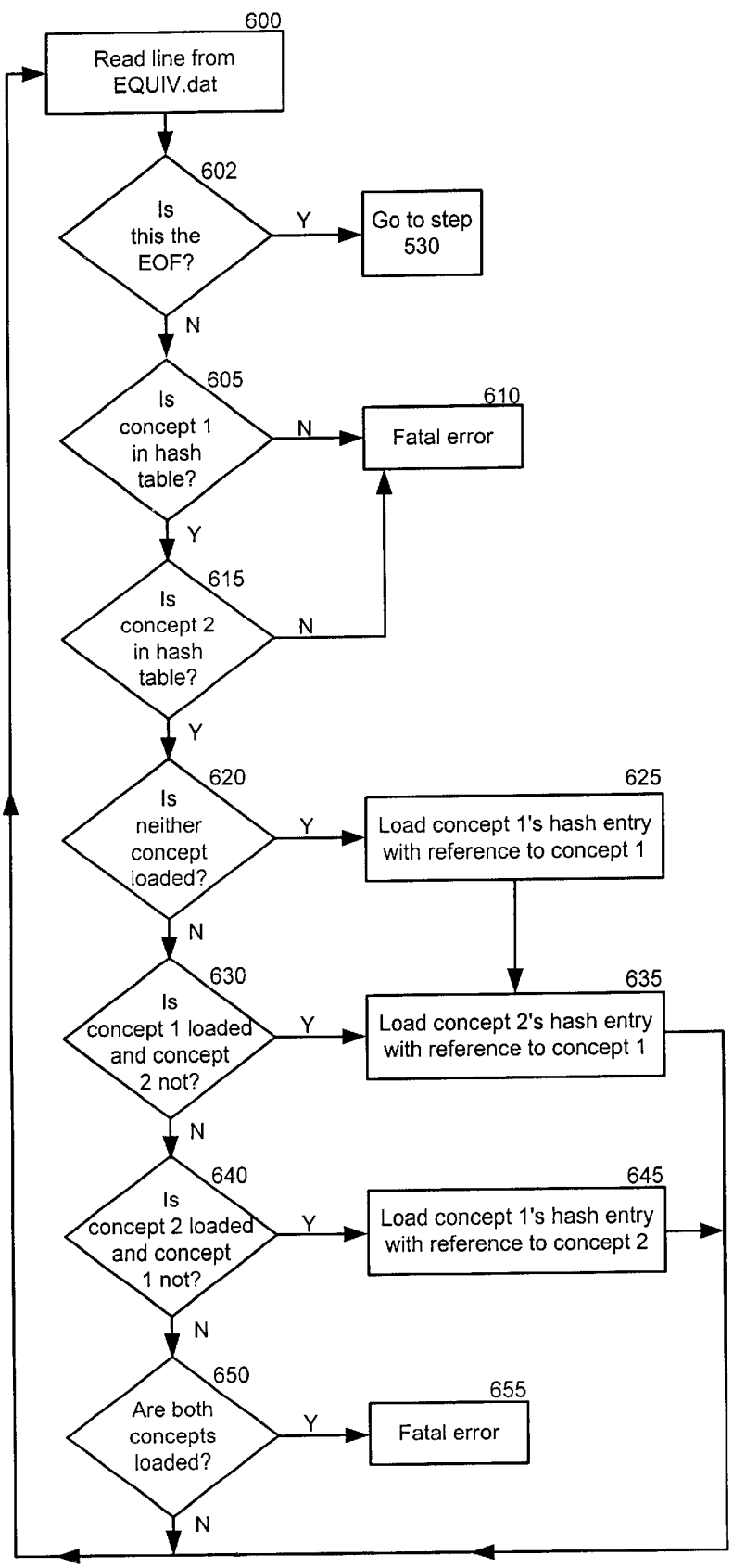
FIG. 6 is a logic flow diagram of a flowchart illustrating a method for processing EQUIV logical relationships.

FIG. 6 displays the EQUIV subroutine 520. The EQUIV subroutine begins with step 600, in which the data analysis and classification system 200 reads a line from a data file containing all EQUIV relationships. Typically, an EQUIV data file is organized such that each line contains two concepts per line, referred to as "concept 1" and "concept 2." Each concept corresponds to a concept recognized by the data analysis and classification system 220. Step 602 is then accessed where it is determined if the EQUIV data file has reached the end of its data. If so, the system returns to step 530. If not, the system goes to step 605.

In step 605, the system checks whether the hash table contains concept 1. If concept 1 is missing, then the system can not establish an EQUIV relationship, and defaults to step 610, ending the process. Presuming the data analysis and classification system 220 finds concept 1 in the hash table, then the system continues to step 615 where it makes a similar determination with respect to concept 2. Again, if the data analysis and classification system 220 fails to find concept 2 within the hash table, then a fatal error occurs and end state 610 is entered.

If both concepts are present in the hash table, then the data analysis and classification system 220 proceeds to decision step 620. The system must determine in step 620 if neither concept 1 nor concept 2 are loaded. A concept is not "loaded" if the object it refers to is the null concept. A concept is "loaded" if it defines a relationship between a term entry and an object other than the null concept. If neither concept is loaded, then step 625 is accessed, and the data analysis and classification system 220 creates a "concept 1" object and loads the hash table entry for concept 1 with the reference to the "concept 1" object. Thus, when the system processes the concept corresponding to concept 1, the reference to concept 1 will be returned. After loading concept 1's reference into the hash table, step 635 is entered. In step 635, the system loads the hash table entry for concept 2 with the reference to the "concept 1" object. Thus, when the system processes the concept corresponding to concept 2, the reference to concept 1 will be returned. In other words, in an EQUIV relationship, both concepts refer to the same object. Once step 635 is executed, the EQUIV subroutine returns to step 600 to read another EQUIV line.

If the data analysis and classification system 220 determines that either concept 1 or concept 2 is loaded in step 620, it becomes necessary to determine which concept is loaded and step 630 is entered. In step 630, the data analysis and classification system checks to determine whether concept 1 is loaded in the hash table, but concept 2 is not. If the system satisfies this determination, then it accesses step 635 with results as discussed above. Otherwise, decision block 640 is entered.

In step 640, the data analysis and classification system 220 checks to see whether concept 2 is loaded and concept 1 is not. In step 645, the system loads the hash table entry for concept 1 with the reference to the "concept 2" object. Thus, when the system processes the concept corresponding to concept 1, the reference to concept 2 will be returned. In other words, in an EQUIV relationship, both concepts refer to the same object. Following step 645, the EQUIV subroutine returns to step 600 to read another EQUIV line.

If the data analysis and classification system 220 does not determine that concept 2 is loaded and concept 1 is not in step 640, then step 650 is accessed. In step 650, the system checks whether both concepts are loaded. If both concepts are loaded then they are both elements of another EQUIV relationship. Therefore, a fatal error has occurred and the EQUIV subroutine 520 halts in step 655. Otherwise, the data analysis and classification system 220 passes the logic check embodied in step 650, and the EQUIV subroutine returns to step 600 to read another EQUIV line.

Figure 7:
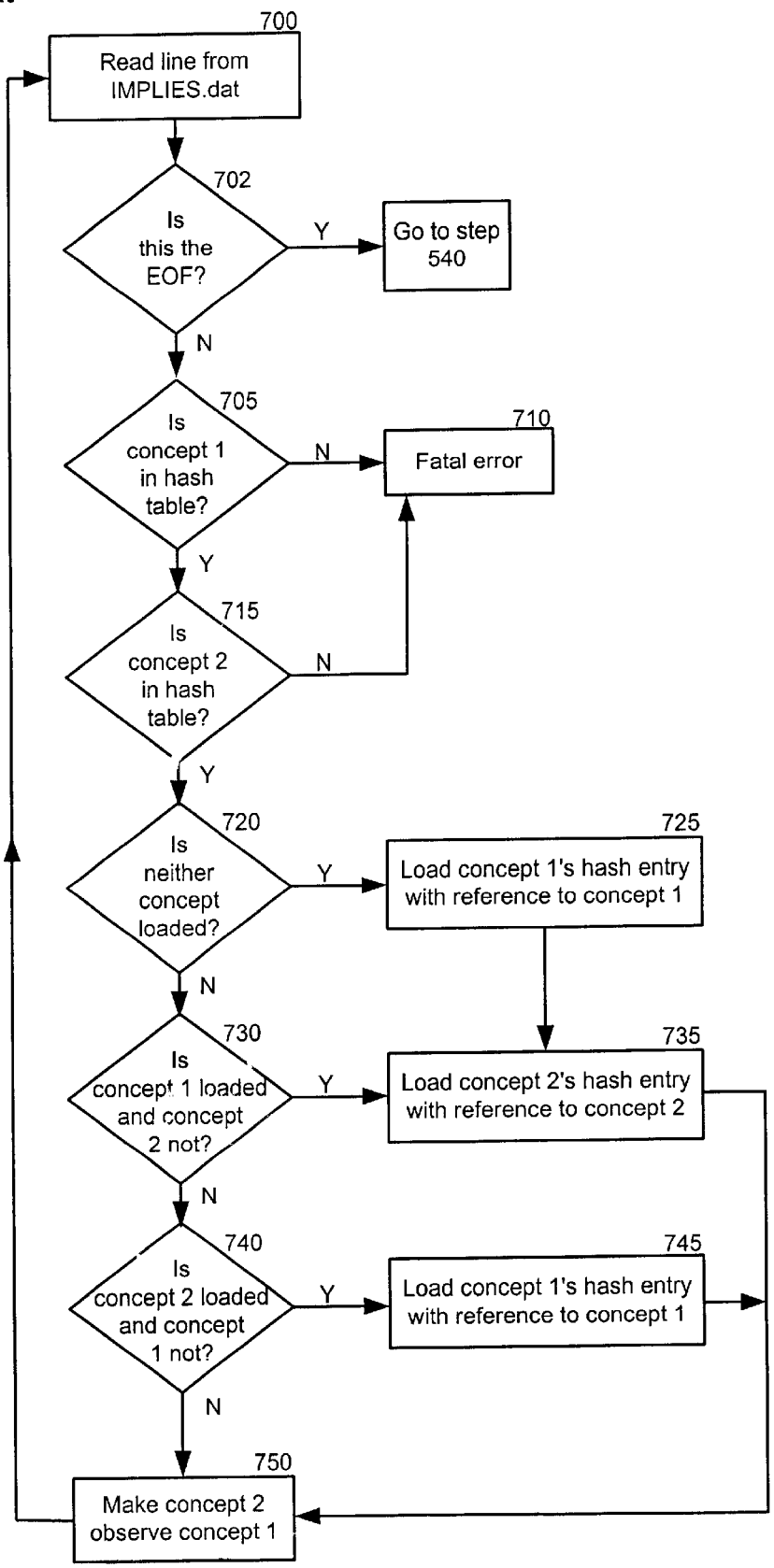
FIG. 7 is a logic flow diagram of a flowchart illustrating a method for processing IMPLIES logical relationships.

Turning now to FIG. 7, the IMPLIES subroutine 530 is shown. The IMPLIES subroutine begins with step 700, in which the data analysis and classification system 220 reads a line from a data file containing all IMPLIES relationships. Typically, an IMPLIES data file is organized such that each line contains two concepts per line, referred to as "concept 1" and "concept 2." Each of these concepts corresponds to a concept recognized by the data analysis and classification system 220. Step 702 is then accessed where it is determined if the IMPLIES data file has reached the end of its data. If so, the system returns to step 540. If not, the system goes to step 705.

Once the data analysis and classification system 220 reads the line, step 705 is entered. In step 705, the system checks whether the hash table contains concept 1. If concept 1 is missing, then the system cannot establish an IMPLIES relationship, and defaults to step 710, ending the process. Presuming the data analysis and classification system 220 finds concept 1 in the hash table, then the system continues to step 715 where it makes a similar determination with respect to concept 2. Again, if the data analysis and classification system 220 fails to find concept 2 within the hash table, then a fatal error occurs and end state 710 is entered.

If both concepts are present in the hash table, then the data analysis and classification system 220 proceeds to decision step 720. The system must determine in step 720 if neither concept 1 nor concept 2 is loaded. If neither concept is loaded, then step 725 is accessed. In step 725, the system loads the hash table entry for concept 1 with the reference to the "concept 1" object. Thus, when the system processes the concept corresponding to concept 1, the reference to concept 1 will be returned. Then, step 735 is entered. In step 735, the system loads the hash table entry for concept 2 with the reference to the "concept 2" object. Thus, when the system processes the concept corresponding to concept 2, the reference to concept 2 will be returned. Once step 735 is executed, step 750 is entered. In step 750, the data analysis and classification system 220 instructs concept 2 to observe concept 1 and therefore mimic any hits it generates. Following step 750, the IMPLIES subroutine 330 returns to step 700.

If the data analysis and classification system 220 determines that either concept 1 or concept 2 is loaded in step 720, it becomes necessary to determine which concept is loaded and step 730 is entered. In step 730, the data analysis and classification system 220 checks to determine whether concept 1 is loaded in the hash table, but concept 2 is not. If the system satisfies this determination, then it accesses step 735 with results as discussed above. Otherwise, decision block 740 is entered.

In step 740, the data analysis and classification system 220 checks to see if concept 2 is loaded and concept 1 is not. If this is the case, then step 745 is entered. In step 745, the system loads the hash table entry for concept 1 with the reference to the "concept 1" object. Thus, when the system processes the concept corresponding to concept 1, the reference to concept 1 will be returned. Once step 745 is executed, step 750 is entered with the results described above. Following step 750, the IMPLIES subroutine 530 returns to step 700.

If the data analysis and classification system 200 does not determine that concept 2 is loaded and concept 1 is not in step 740, then step 750 is accessed with results as described above. Following step 750, the IMPLIES subroutine 530 returns to step 700 to read another IMPLIES line.

Figure 8:
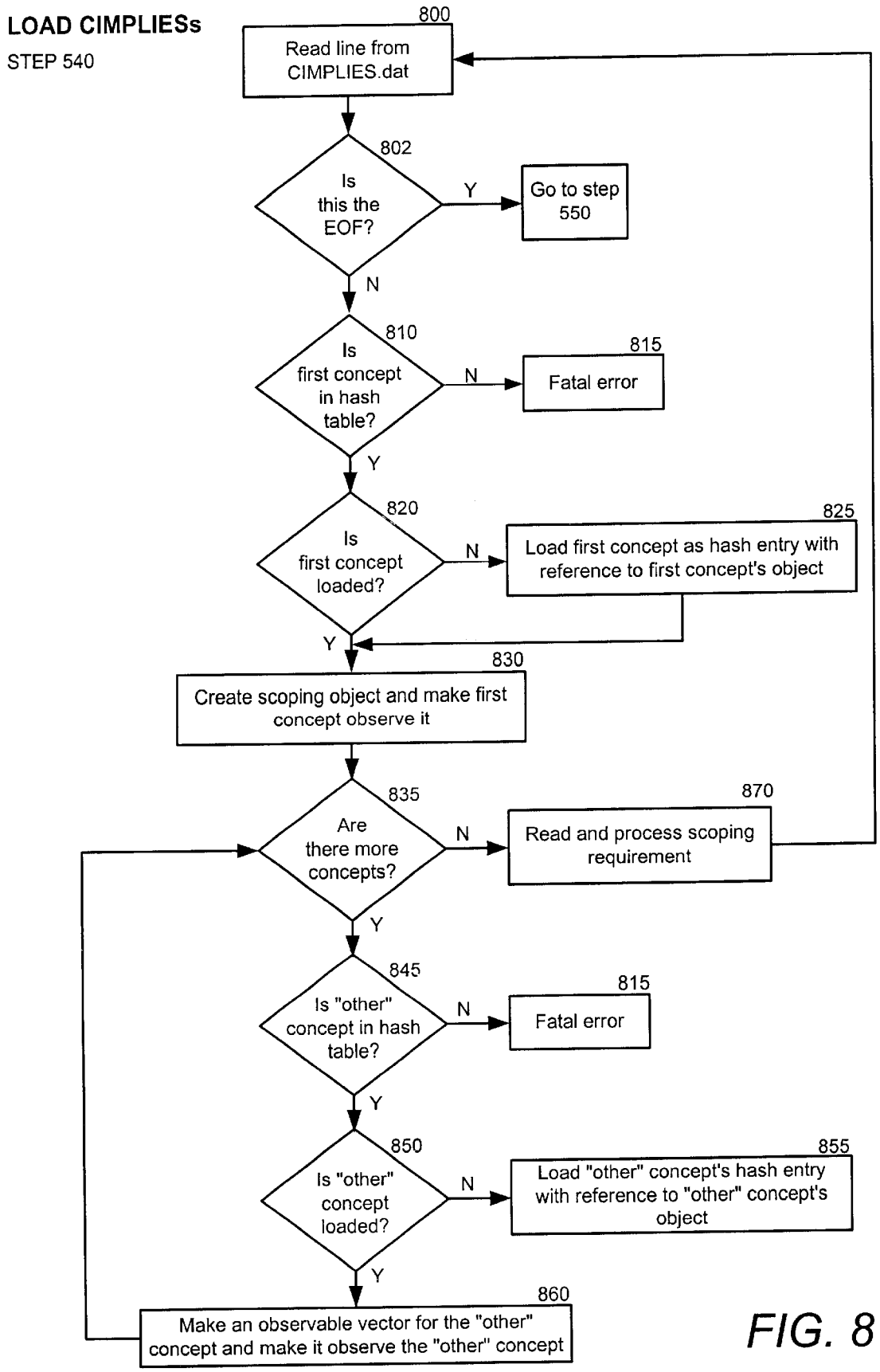
FIG. 8 is a logic flow diagram of a flowchart illustrating a method for processing multiple association logical relationships.

FIG. 8 displays the CIMPLIES subroutine 540. The CIMPLIES subroutine reads in, processes, and sets up any co-implications. Co-implications are those relationships in which more than one concept is needed to imply another concept. For example, a CIMPLIES may require that three concepts all be present in order to activate or imply a fourth concept.

The CIMPLIES data file consists of all of the co-implications in the ACN. Unlike the EQUIV and IMPLIES relationships that contain an entire entry on a single line in the data file, the CIMPLIES relationship requires two lines for each co-implication, the first line containing the implication itself, and the second line containing the required scoping information for the implication. The CIMPLIES subroutine 540 begins in step 800, where the data analysis and classification system 220 reads the first line (implication) from a data file containing all co-implications. The first line contains at least three concepts. Unlike EQUIV or IMPLIES relationships, a line from the CIMPLIES data file must contain more than two concepts. Step 802 is then accessed where it is determined if the CIMPLIES data file has reached the end of its data. If so, the system returns to step 550. If not, the system goes to step 810. In step 810, the data analysis and classification system 220 determines if the first concept in the data file line is present as a term entry in the hash table. In the event that it is not, a fatal error occurs and step 815 is entered, terminating the CINMPLIES subroutine 540.

However, if the data analysis and classification system 220 locates the first concept in the hash table, then step 820 is executed. In step 820 the system determines whether the first concept has been loaded. If not, then in step 825, the system loads the hash table entry for the first concept with the reference to the first concept's object. Thus, when the system processes the concept corresponding to the first concept, the reference to the first concept's object will be returned. Following step 825, step 830 is entered.

If it is determined in step 820 that the first concept is loaded, step 830 is accessed. In step 830, the data analysis and classification system 220 creates a scoping object in the ACN. A scoping object remembers the locations in the electronic information 100 of all the concepts defined in the CIMPLIES relationship; and if all of the concepts are identified, it checks to see if the concepts are found within the defined distance parameters or scope (e.g. 1 paragraph, 3 words, etc.). If all conditions of the scoping object are met, it notifies all objects that observe it. The system sets up the first concept to observe the scoping object. When any concept observes a second concept, the first concept is notified when the second is activated, or hit.

Following the creation of the scoping object, step 835 is entered, wherein the data analysis and classification system 220 determines whether the data file line read in step 800 contains any other concepts. If not, the CIMPLIES subroutine 540 processes the scoping information in step 870 and returns to step 800. Alternately, the system may determine that additional concepts require processing, and so proceed to step 845. In step 845, the data analysis and classification system 220 looks for the presence of the next concept (called the "other concept") extracted from the data file line in the CIMPLIES file. If the other concept is not present in the hash table, then a fatal error occurs (step 815), terminating the CIMPLIES subroutine 540 and the operation of the data analysis and classification system 220.

Otherwise, step 850 is next. In step 850, the data analysis and classification system 220 determines whether the other concept is loaded. If not, then in step 855, the system loads the hash table entry for the other concept with the reference to the other concept's object. Thus, when the system processes the concept corresponding to the other concept, the reference to the other concept's object will be returned.

If step 850 yields a positive determination then in step 860, the system creates an observable vector inside the scoping object. This observable vector is made to observe the other concept's concept object. An observable vector is a logical link that informs a its scoping object when the other concept is triggered or hit. For example, presume that there are four concepts: A, B, C, and Z. Also, presume that concept Z will only register a hit when concepts A, B, and C are all present in the electronic information 100. To implement this structure, the CIMPLIES data file will contain the line "Z A B C". Upon reading this line, the data analysis and classification system 220 first creates a scoping object Z'. Then it makes Z observe the scoping object Z'.

Then as the system reads the concepts A, B, and C, it creates three observable vectors, one each for A, B, and C, and makes the three observable vectors a part of scoping object Z'. During electronic information processing, the scoping concept Z' will trigger concept Z only when all three observable vectors indicate that concepts A, B, and C are present within a specified distance of each other.

Following the observable vector creation in step 860, step 835 is once again accessed as described above. This loop continues until the data analysis and classification system 220 processes all concepts on the data field line read in step 800. After step 835 determines that all concepts have been processed, step 870 reads the second line in the CIMPLIES data file that contains the scoping information and stores that information with the scoping object. Then the system returns to step 800 to read another co-implication from the CIM-PLIES data file.

Each entry in the IOV data file contains (1) a line with the concepts that define of an IOV object, (2) a line with the scoping requirements for the IOV, and (3) a line defining the report that is to be issued. During electronic information processing, the IOV object will issue a report only when all of the concepts defined on the first line are present within a specified distance of each other.

Figure 9:
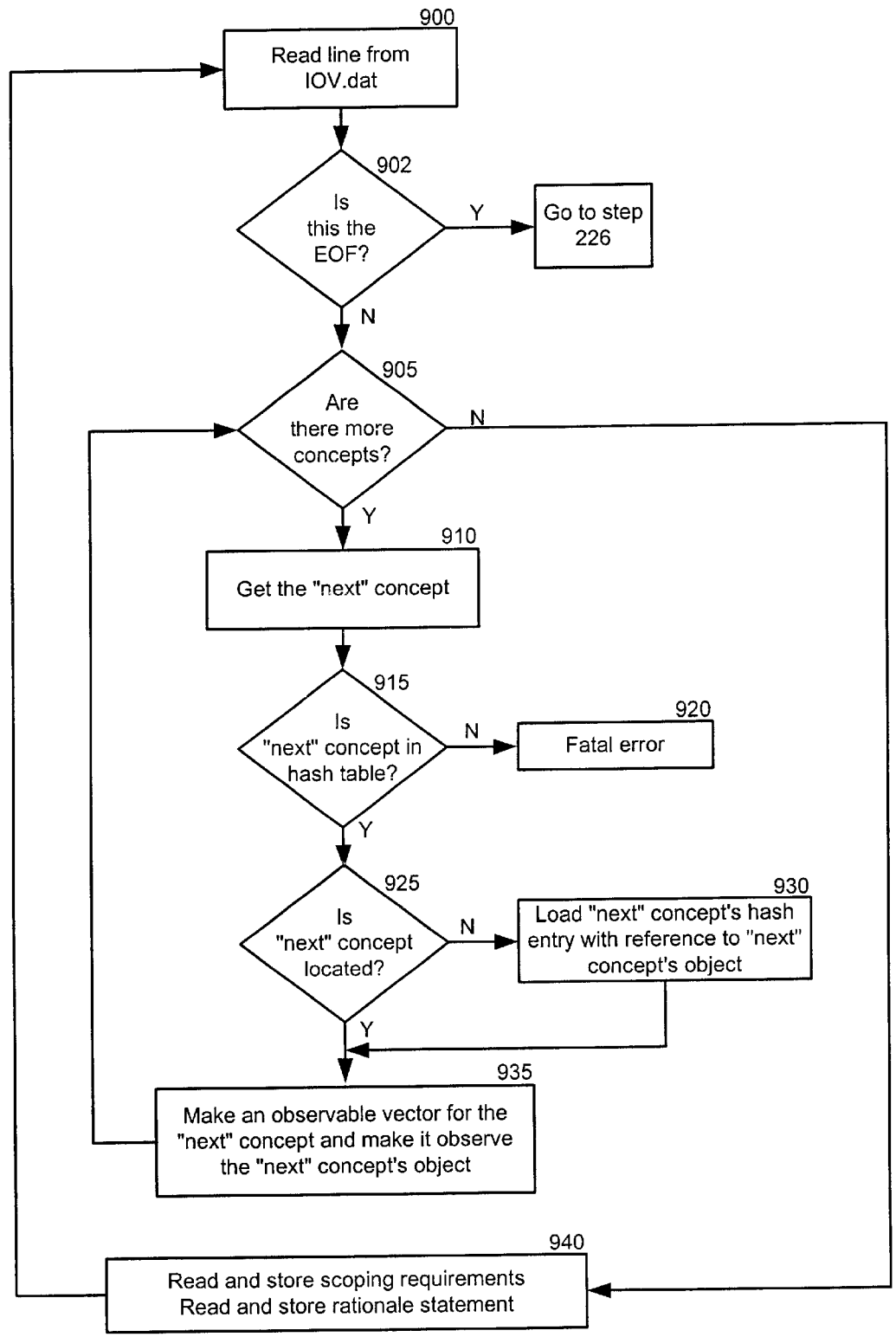
FIG. 9 is a logic flow diagram of a flowchart illustrating a method for processing rules.
Figure 10:
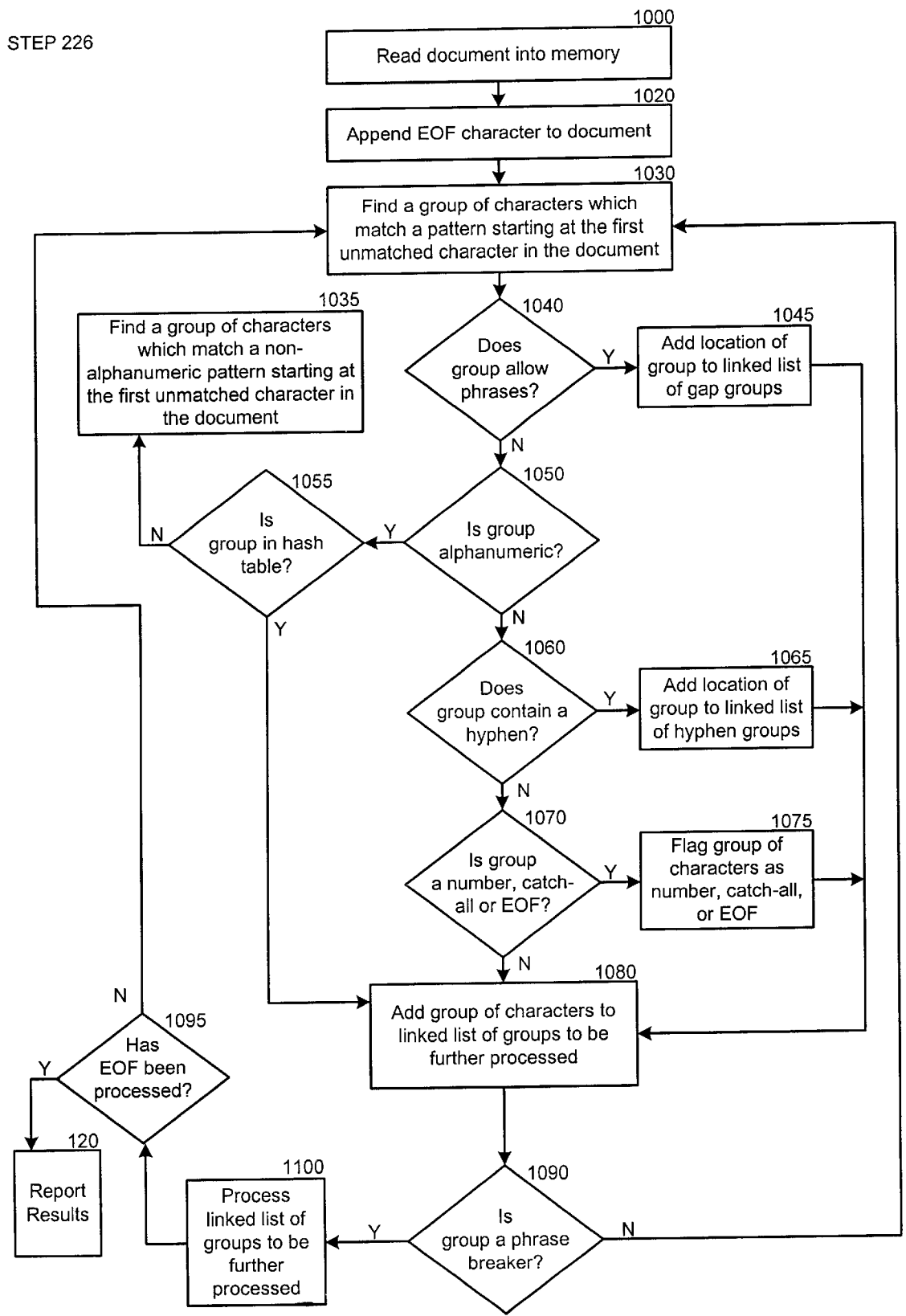
FIG. 10 is a logic flow diagram of a flowchart illustrating a method for propagating a concept through an ACN.

FIG. 9 depicts the IOV subroutine 550. The IOV subroutine initiates all IOV concepts to be applied to the electronic information 100 by the data analysis and classification system 220. The subroutine begins with step 900, wherein the data analysis and classification system 220 reads a line from the IOV data file. Step 902 is then accessed where it is determined if the IOV data file has reached the end of its data. If so, the system returns to step 226. If not, the system goes to step 905.

Following step 902, the data analysis and classification system 220 determines in step 905 whether the line contains any additional concepts. If not, then step 940 is entered. In step 940, the data analysis and classification system 220 reads the next line and stores any scoping information for the IOV and then reads and stores the last line of the IOV entry which contains the IOV's report. After step 940 the system returns to step 900 to read another IOV entry.

If the data analysis and classification system 220 finds more concepts on the line in step 905, then step 910 is accessed. In step 910, the next concept associated with the IOV is retrieved step 915 follows. The data analysis and classification system 220 checks to see if the concept is present in the hash table. If the system does not locate the concept in the hash table, then fatal error 920 is accessed.

Otherwise, step 925 is accessed. In step 925, the data analysis and classification system 220 determines whether the concept is loaded. If not, then in step 930, the system loads the hash table entry for the concept with the reference to the concept's object. Thus, when the system looks up the concept, its object will be returned.

If the data analysis and classification system 220 determines that the concept is loaded in step 925, or following step 930, step 935 is accessed. In step 935, the system creates an observable vector inside the scoping object. This observable vector is made to observe the object of the concept being processed. Observable vectors are more fully discussed with respect to step 860 of FIG. 8. After step 935, decision block 905 is again accessed. The IOV subroutine 550 continues until the data analysis and classification system 220 determines in step 905 that no more concepts exist. At that point, step 940 is executed, wherein the system reads the last two lines from the IOV file and stores them with the IOV object. The first line contains the scoping information and the last the output statement to be presented when the IOV requirements are met during the electronic information 100 processing. Then step 900 is entered again to see if another IOV must be created.

Operation of the Pattern Recognition Routine

There are several things that must happen to accomplish tracing through the ACN to locate all concepts and IOVs that are inferred by single concepts. The text stream comprising the electronic information 100 consists of characters. Those characters form words, spaces between words, patterns that indicate the end of a sentence ("?.!"), numbers, alphanumeric words such as F16 or B52, new line characters, special characters (/#), patterns that indicate paragraphs, hyphenated words, and the end-of-file (eof) character. Additionally, some groups of words are typically handled as single concepts (for example, calcium oxide may be better handled as calcium-oxide.) Further, words may be hyphenated at the end of a line.

The data analysis and classification system 220 uses patterns to group the input characters into words, numbers, sentence endings, and so on. Some patterns prevent the creation of phrases. For example, a comma between two words indicates to the system that those two words cannot be made into a phrase. These patterns are known as "phrase breakers." Patterns that match anything not covered by other patterns are called "catch-all patterns." Finally, the eof pattern signals the end of the electronic information 100.

FIG. 10 displays a flowchart depicting the propagation routine 1000. The process begins when the data analysis and classification system 220 reads an entire set of electronic information 100 in step 1010. Following step 1010, step 1020 is executed.

In step 1020, the data analysis and classification system 220 appends the end-of-file character to be added to the end of the electronic information. Step 1030 is then entered.

In step 1030, the data analysis and classification system 220 starts at the beginning of the part of the electronic information that has not been processed before and finds a pattern that matches the first group of characters. As mentioned above these groups may form a word, a number, a set of spaces, a comma or period followed by a space, and so on. Following step 1030, step 1040 is accessed, wherein the system determines if the group of characters allows the preceding and following groups to form a phrase. Spaces and new line characters fall into this category. Groups of this sort are called gap groups. If the group of characters allows the preceding and following groups to form a phrase, then step 1045 is executed. Otherwise the data analysis and classification system 220 proceeds to step 1050.

In step 1045, the data analysis and classification system 220 records the location of the gap group in the linked list of gap groups for further examination later. Following step 1045, step 1080 is entered.

Step 1050 is accessed from step 1040. In this step, data analysis and classification system 220 determines if the group comprises alphanumeric characters. That is, the system determines whether the group consists entirely of letters, numbers, or hyphens. If so, step 1055 is executed. Otherwise, step 1060 is executed.

Step 1055 instructs the data analysis and classification system 220 to determine if the alphanumeric group forms a recognized entry in the hash table 830. For example, consider the two alphanumeric strings "F16d" and "24 cm." If the hash table 330 concerns military aircraft, then the concept F16d will likely be present as an entry. Thus, "F16d" would be recognized as a legitimate alphanumeric string. However, the string "24 cm" may not be located in the table. This test allows the data analysis and classification system 220 to process the concept "F16d" correctly, and also properly handle the group "24 cm." In the event that the system returns a positive determination in step 1055, step 1080 is executed. Otherwise, step 1035 is executed.

In step 1035, the data analysis and classification system 220 starts at the beginning of the part of the electronic information that has not been processed yet and finds a non-alphanumeric pattern matching the first group of characters present in the electronic information. As mentioned above, these groups may form a word, a number, a set of spaces, a comma, a period followed by a space, and so on. Following step 1035, step 1040 is accessed with results as discussed above.

In step 1060, the data analysis and classification system 220 determines if the group contains a hyphen. Groups containing a hyphen are called "hyphen groups." If the group comprises a hyphen group, then the system proceeds to step 1065. If the group is not a hyphen group, then step 1070 is entered. In step 1065, the data analysis and classification system 220 records the location of the hyphen group in a linked list of hyphen groups, and then accesses step 1080.

The data analysis and classification system 220 determines in step 1070 if the group is a number, a catch-all, or an eof character. If the group is any of these three, then step 1075 is executed. Otherwise, processing continues with step 1080.

In step 1075, the data analysis and classification system 220 flags the group identified in step 1070 as to whether it comprises a number, catch-all, or an eof character. Execution continues with step 1080.

In step 1080, the data analysis and classification system 220 adds the group of characters to the linked list of character groups matched in the electronic information 100. At this point, groups have been identified which may be hyphenated words, parts of phrases, numbers, and so on. However, no hyphens have been removed, nor have phrases been tested.

Step 1090 is executed next, wherein the data analysis and classification system 220 determines if the group allows phrases to be created across the group. For example, the words on either side of the group ", " can not be joined into a phrase. Groups of this type are called "phrase breakers." Groups that indicate the end of a sentence or paragraph also may not allow phrases across them. Certain characters, such as a parenthesis or ampersand symbol are also phrase breakers. If the group is a phrase breaker, then the linked list of groups may be processed for phrases and step 1100 is executed. Otherwise, the system returns to step 1030. This loop, beginning with step 1030, is continually executed until a phrase breaker is found.

In step 1100, the linked list of groups is processed for phrases, as discussed in greater detail with respect to FIG. 11 below. Step 1100 is followed by step 1095, wherein the data analysis and classification system 220 determines whether or not the eof character has been processed. If the system has not processed the eof character, step 1030 is executed. Otherwise, step 120 is entered, wherein the results of the classification process is reported. Typically, this report takes the form of a printout, but may alternately be displayed on any display device capable of depicting the results, such as a monitor 114. Following step 120, the system returns to step 226 to process more electronic information 100. At this point the system may be told to terminate or to process another set of electronic information 100.

The propagation routine 1000 is typically implemented using a switch statement. Those skilled in the art will realize that there are many different ways to parse the electronic information looking for the patterns mentioned above. Accordingly, the above routine is but a single embodiment of the invention, and is intended by way of example rather than limitation. The scope of the invention is accordingly set forth by the claims below.

Operation of the Hyphenation Processing Routine

Figure 11:
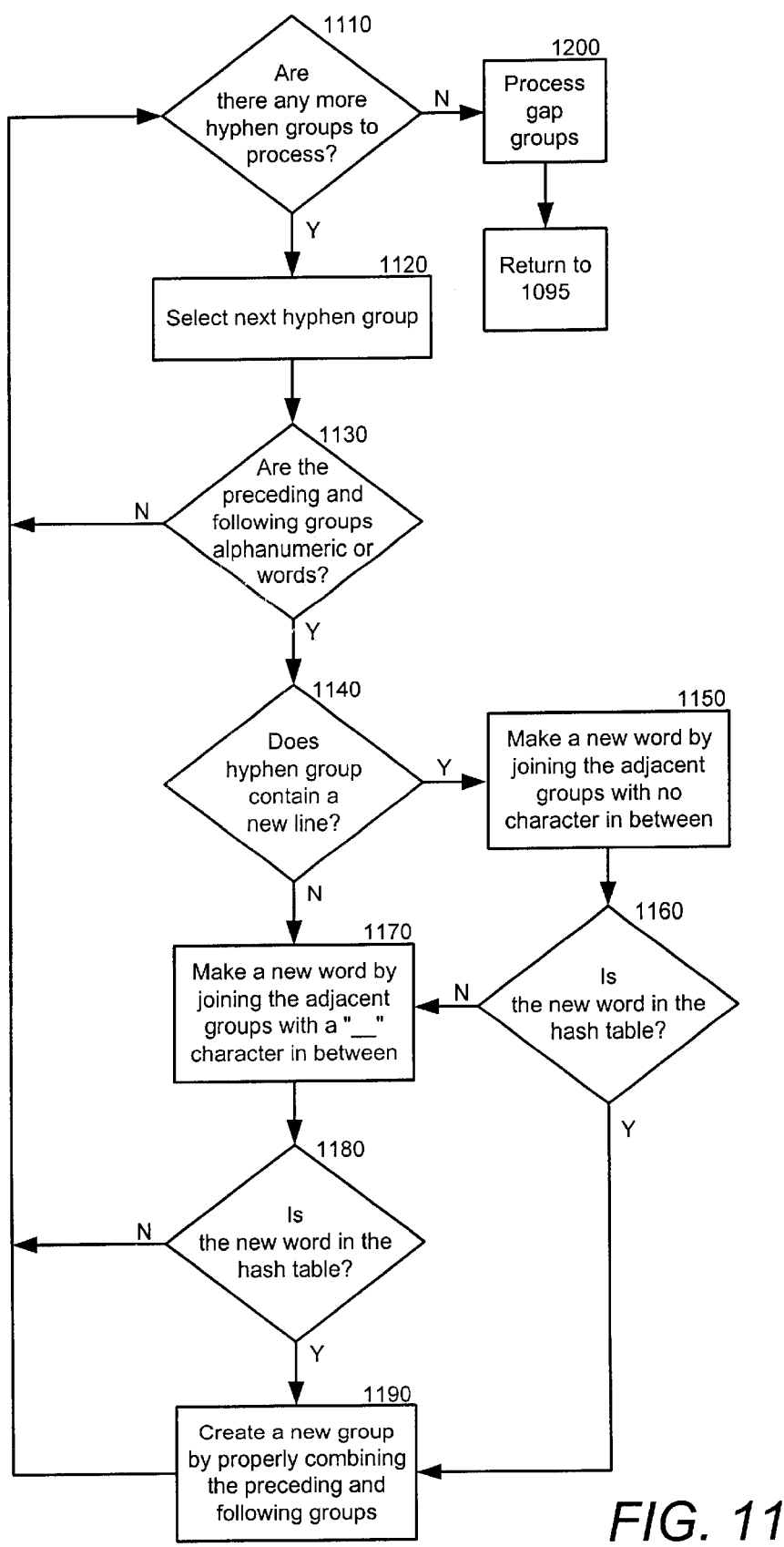
FIG. 11 is a logic flow diagram of a flowchart further illustrating a method for propagating a concept through an ACN.

FIG. 11 displays a flowchart depicting the hyphenation processing subroutine 1100. The process begins when the data analysis and classification system 220 recognizes a phrase breaking pattern during the pattern recognition routine 1000, and passes control to step 1110.

In step 1110, the data analysis and classification system 220 determines whether any more hyphen groups must be processed. If not, then step 1200 is executed. If so, execution continues with step 1120, wherein the system selects the next hyphen group to process. Following step 1120, step 1130 is entered.

The data analysis and classification system 220 tests the preceding and following groups in step 1130 in order to see if they are alphanumeric groups, and therefore candidates for hyphenation processing. If the groups fail this test, then step 1110 is accessed. If the groups are candidates for hyphenation processing then step 1140 is executed.

In step 1140, the data analysis and classification system 220 determines whether the hyphen was followed by a new line character. If so, then the groups adjacent to the new line may be two parts of a hyphenated word. An example may serve to illustrate this concept. Suppose the electronic information 100 contains the characters "calcium ox-{new line} ide." Ideally, the hyphenation process should yield "calcium oxide." In the event a new line character exists, as in our example, step 1150 is executed. Otherwise, step 1170 follows.

In step 1150, the data analysis and classification system 220 makes a new word out of the adjacent two groups by omitting the hyphen and new line character. In our example, the system creates the word "oxide." Step 1160 continues the process.

The data analysis and classification system 220 checks to see if the new word is present in the hash table 330 in step 1160. If so, then the new word will be further processed in step 1190. If the new word is not in the hash table, then step 1170 is executed.

In step 1170 the data analysis and classification system 220 makes a new word out of the two adjacent words by combining them a hyphen between them. Step 1180 is next.

In step 1180, the data analysis and classification system 220 determines whether the new word is present in the hash table 330. If so, the system proceeds to step 1190 to join the two adjacent words. Otherwise, the system returns to step 1110, with results as discussed above.

In step 1190, the data analysis and classification system 220 replaces the three groups being scrutinized with a single group containing the new word found in the hash table 330. Thus, further processing of the above example will find the three groups "calcium", "", and "oxide" rather than the hyphenated "oxide." Processing continues with step 1110.

After step 1200, control passes to step 1095 shown in FIG. 10.

Operation of the Gap Processing Routine

Figure 12:
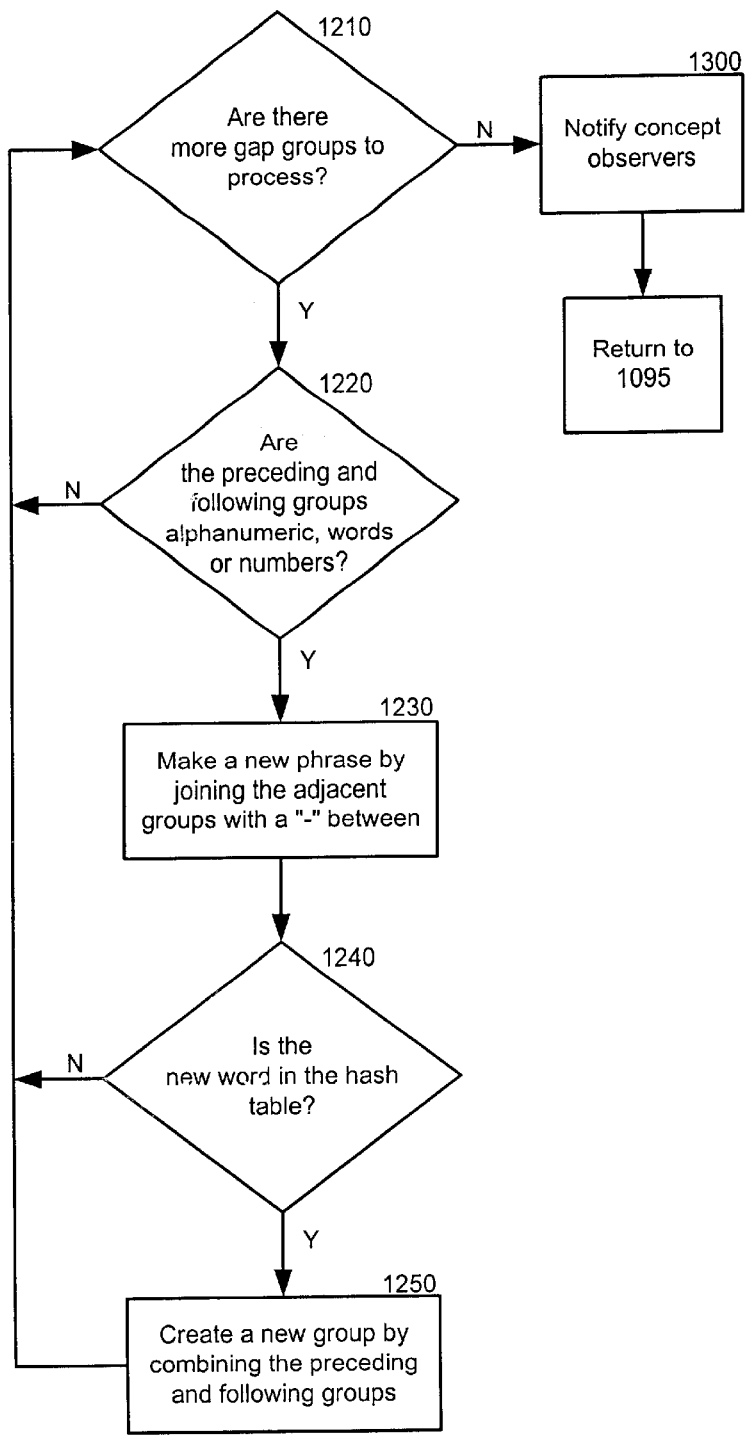
FIG. 12 is a logic flow diagram of a flowchart further illustrating a method for propagating a concept through an ACN.

FIG. 12 displays a flowchart depicting the gap processing subroutine 1200. The process begins when the hyphen processing completes and passes control to step 1210.

In step 1210, the data analysis and classification system 220 checks to see if all of the gaps have been processed. If not, then control passes to step 1220. If all gaps have been processed then the propagation process begins with step 1300.

The data analysis and classification system 220 determines in step 1220 if the preceding and following groups are alphanumeric groups of any sort, including words and numbers. If not, then step 1210 executes. If so, step 1230 is executed.

In step 1230, the data analysis and classification system 220 makes a new phrase by combining the preceding and following groups with a hyphen. Continuing the example from the discussion of FIG. 11, the three groups "calcium", "", and "oxide" would be made into the phrase "calcium-oxide." Step 1240 continues the process; wherein the system checks to see if the phrase created in step 1230 is present in the hash table 330. If so, step 1250 is executed. Otherwise, control passes back to step 1210.

The data analysis and classification system 220 creates a new group out of the three previous groups in step 1250 by combining the preceding and following groups. Placing a hyphen between the groups performs this combination. For example, if the system started with the five groups "life", "", "and ", "", and "death" that this process would first create the three groups "life-and", "", and "death." Upon processing the subsequent gap, the system would produce the single phrase "life-and-death," assuming that life-and-death had been entered into the dictionary file. Control passes from here to step 1210.

After step 1300, control passes to step 1095 shown in FIG. 10.

Processing of Concepts and Interconcept Groups of Characters

A concept is now considered to be a set of characters that are either a word or group of words combined into a phrase. An interconcept group of characters is a group between concepts. Every set of characters that have not been combined into phrases and words are groups of characters between concepts.

Figure 13:
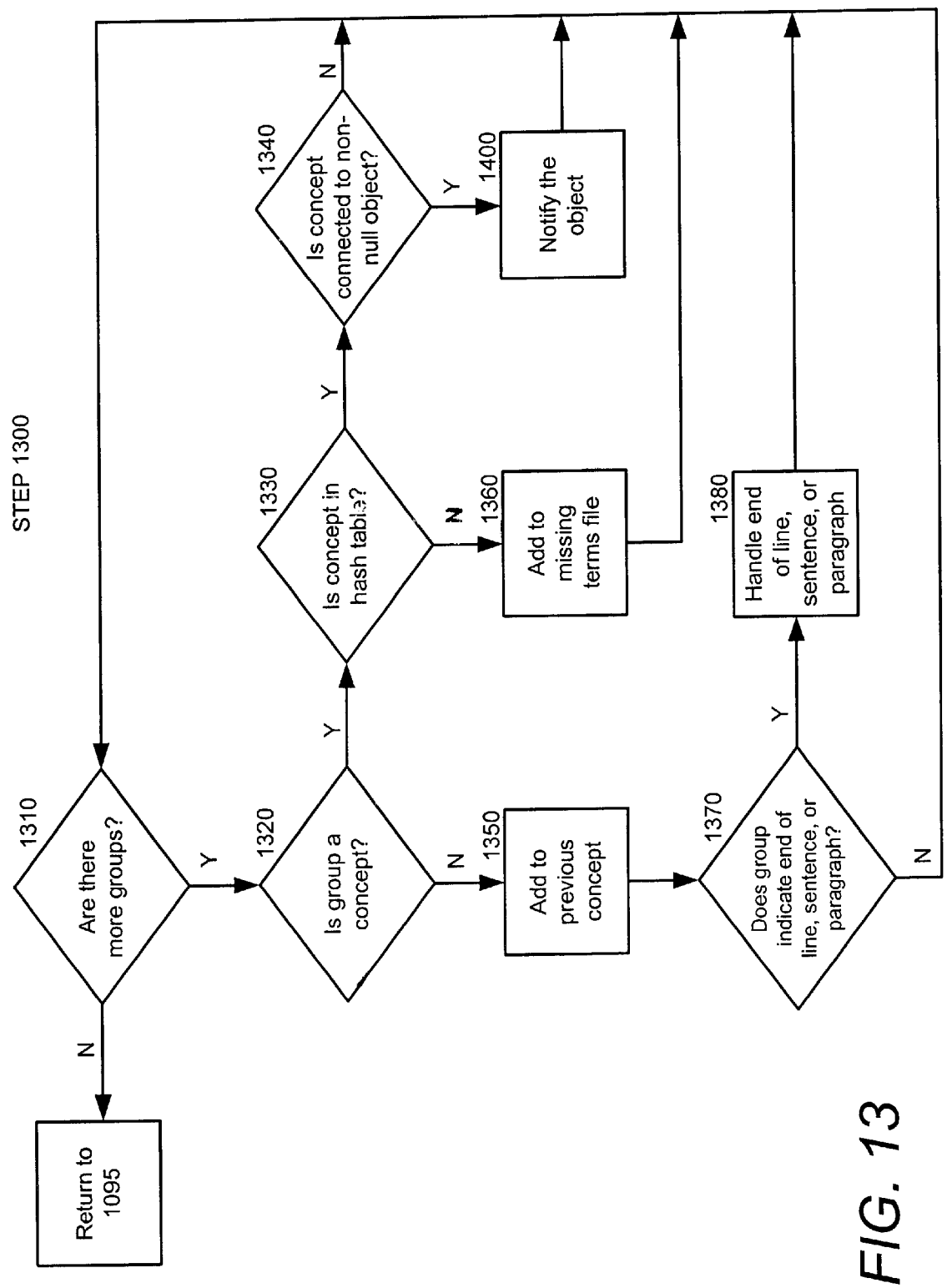
FIG. 13 is a logic flow diagram of a flowchart further illustrating a method for propagating a concept through an ACN.

FIG. 13 displays a flowchart depicting the processing of concepts and interconcept groups of characters via subroutine 1300. The process begins when gap processing completes and passes control to step 1310.

In step 1310, the data analysis and classification system 220 checks to make sure that there is another group to process. If not, control passes to step 1095 shown in FIG. 10. If another group exists to process, step 1320 is executed.

The data analysis and classification system 220 checks in step 1320 to see if the group comprises a concept. If so, the system accesses step 1330. Otherwise, step 1350 is executed.

In step 1330, the data analysis and classification system 220 further checks the concept to see if it is present in the hash table 330. If not, the data analysis and classification system 220 fails to recognize the concept and proceeds to step 1360. If the system locates the concept in the hash table 330, further checking is done in step 1340.

In step 1340, the data analysis and classification system 220 determines if the object indicated by the hash table 330 is the null object. A null object result indicates that the data analysis and classification system 220 recognizes the concept but attaches no importance to the concept. Words such as "a," "it," "the," and "but" are null concepts. If the object is null, processing continues with step 1310 to see if there are more groups to handle. Otherwise, subroutine 1400 is entered, wherein the system notifies other objects that a non-null object has been encountered. This process will be further discussed with respect to FIG. 14.

In step 1350, the data analysis and classification system 220 saves the interconcept group by attaching it to the previous concept. This is done for output purposes. Step 1370 is next.

In step 1360, the data analysis and classification system 220 adds the unknown concept to the unprocessed terms file.

An expert may later review this file to decide how to handle the concepts therein. Following step 1360, step 1310 is entered with results as discussed above.

The data analysis and classification system 220 determines in step 1370 whether the interconcept group indicates the end of a line, sentence, or paragraph. If not, the system loops back to 1310 in order to process and remaining groups. If the determination is positive, step 1380 is executed. In step 1380, the data analysis and classification system 220 handles the end of line, sentence, or paragraph before heading back to step 1310. The system handles the end of lines, sentences, and paragraphs by storing the numbers of the concepts which start and end the lines, sentences, and paragraphs respectively. The system uses this information for scoping tests and for formatting the output report 120.

Tracing the Inferences of Concepts Through the ACN

Figure 14:
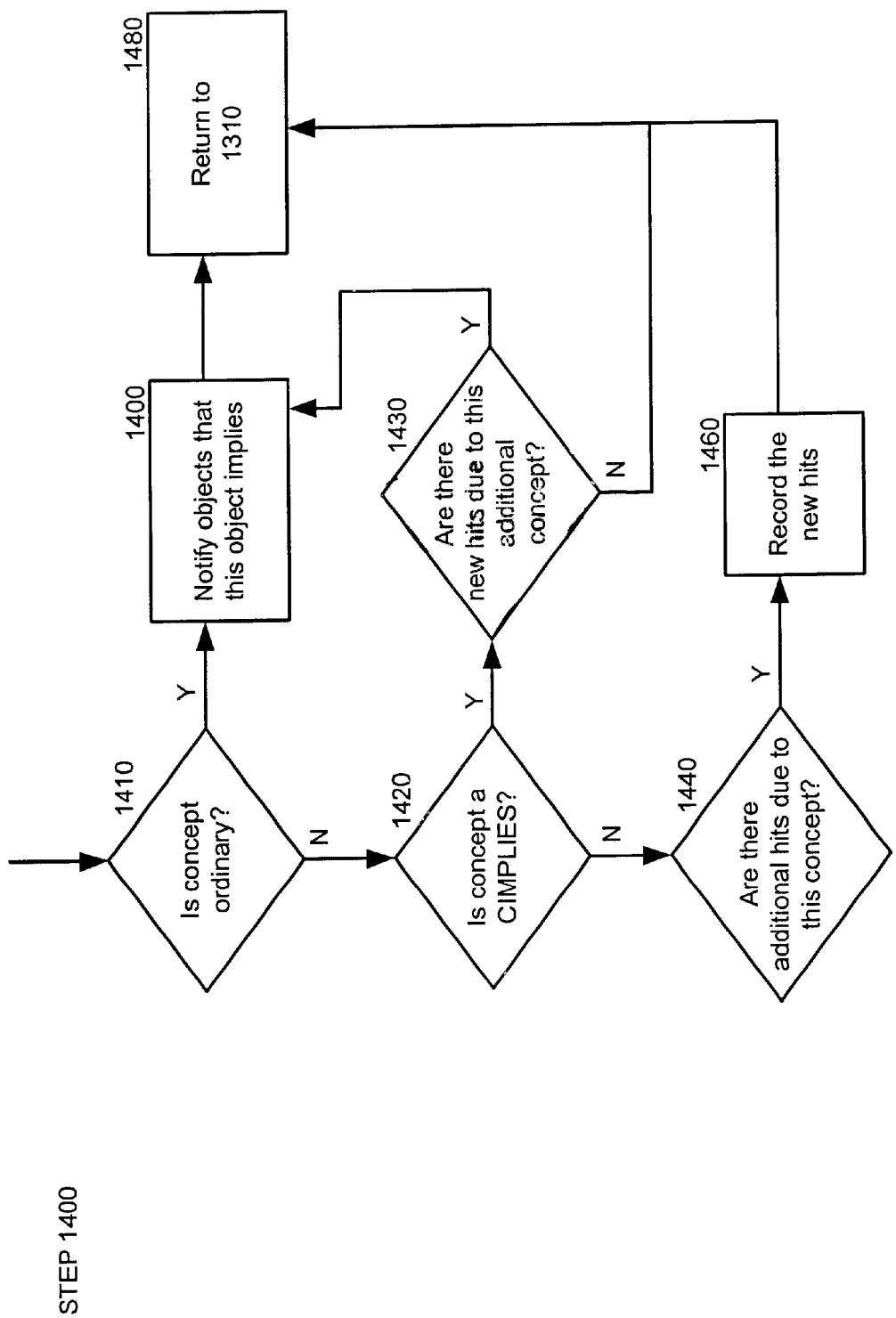
FIG. 14 is a logic flow diagram of a flowchart further illustrating a method for propagating a concept through an ACN.

FIG. 14 shows how any single object notifies its observers. It is therefore true that when step 1400 of FIG. 13 executes there may be many executions of FIG. 14.

FIG. 14 displays a flowchart depicting subroutine 1400 in which the method used to trace inferences through the ACN is shown. In this subroutine, the inferences of concepts are traced through the ACN 360 in order to determine whether any IOV triggers a rule or association. The process begins when a viable concept is found and control is passed to step 1410.

Step 1410 determines if the concept is an "ordinary concept." The current embodiment of the invention has two types of concepts. The ordinary concept is a simple one-to-one implication. For example, the object "cat" may imply the object "feline." The CIMPLIES concept requires more than one concept to make the implication. For example, the concepts "blue," "clouds," and "sun" may imply the concept "sky." A third concern here is the IOV object. This object has no implications at all, but is the mechanism whereby hits are reported. For example, if part of the purpose of the knowledge base is to detect the presence of predators in the forest, an IOV object having the concepts "predator" and "forest" may be written. Any time both concepts are found within a certain range of each other (the scoping requirement), the IOV may fire and register a hit to be reported later. The exemplary embodiment has three units of measurement for the range or scope of an IOV, namely words, sentences, and paragraphs. Those skilled in the art will realize that other concepts could easily be part of an alternate embodiment, such as the entire electronic information scope, or a page scope.

In step 1410, the data analysis and classification system 220 checks to see if the concept is a one-to-one concept. If so, step 1400 is executed for all objects that the current object notifies both directly and indirectly. When all objects are notified, the system returns to step 1310 shown on FIG. 13. If the concept is not a one-to-one concept, then step 1420 is executed.

In step 1420, the data analysis and classification system 220 determines whether or not the concept is a CIMPLIES. If so, step 1430 is accessed. If not, then the concept must not be a concept at all but is an IOV object and step 1440 is entered.

In step 1430, the data analysis and classification system 220 checks to see if the new concept causes additional implications to be made. Continuing the "sky" example above, the concept "blue" may not infer the concept "sky" unless "sky" is close enough (that is, within a required scope) to the concepts "cloud" and "sun." If the implication is warranted, step 1400 is executed for every concept that the CIMPLIES notifies. After all notifications are made, the system returns to step 1310.

Step 1440 applies to IOV objects. The data analysis and classification system 220 registers a hit if the new concept is close enough to other objects previously found in the electronic information 100. If so, the new hit is recorded and control returns to step 1310.

Conclusion

The data analysis and classification system 220 may include additional functionality not herein specifically described. For example, the system may allow a user to profile the electronic information for information like the date of the electronic information, the author, and so on. The data analysis and classification system 220 may also accept multiple types of electronic information input beyond those listed, including input from remote locations, across the internet or intranet, or machine-readable files. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

The invention claimed is:

1. A method for identifying information of value (IOV) from electronic data, comprising:

receiving the electronic data, the electronic data including a plurality of characters;

analyzing the characters from the electronic data to identify a group of characters;

determining whether the group of characters corresponds to a concept by comparing the group of characters to an entry in a hash table;

if the group of characters corresponds to the concept, then determining whether the concept is associated with an object;

if the concept is associated with an object, then notifying the object;

determining whether all conditions for the IOV are satisfied; and if all conditions for the IOV are satisfied, then identifying the IOV.

2. The method of claim 1, wherein determining whether all conditions for the IOV are satisfied comprises:

determining whether the concept and a second concept are present in the electronic data.

3. The method of claim 2, wherein the IOV includes a scope parameter and wherein the scope parameter specifies that the concept and the second concept are within a predetermined distance.

4. The method of claim 1, further comprising:

if the object is associated with a second object, then notifying the second object.

5. The method of claim 1, wherein the object corresponds to a co-implies relationship for the concept and a second concept, comprising:

if the object is notified by the concept and the second concept, then determining that a third concept co-implied by the concept and the second concept is present in the electronic data.

6. The method of claim 1, further comprising:

if the concept is associated with a null concept, then terminating processing of the concept.

7. The method of claim 1, further comprising:

if the group of characters does not correspond to the concept, then determining that the group of characters is an unprocessed term.

8. The method of claim 1, wherein analyzing the characters from the electronic data to identify a group of characters comprises:

combining a first group of characters and a second group of characters with a hyphen.

9. The method of claim 1, further comprising:

analyzing the characters from the electronic data to identify a second group of characters;

determining whether the second group of characters corresponds to a second concept by comparing the second group of characters to a second entry in a hash table;

if the second group of characters corresponds to the second concept, then determining whether the second concept is associated with a second object; and if the second concept is associated with the second object, then notifying the second object.

10. The method of claim 1, wherein the electronic data includes a document.

11. The method of claim 1, wherein the hash table includes a plurality of entries, each entry corresponding to a concept.

12. The method of claim 1, further comprising:

determining whether all conditions for a second IOV are satisfied, wherein determining whether all conditions for the IOV are satisfied and determining whether all conditions for the second IOV are satisfied occur simultaneously.

13. A method for identifying information of value (IOV) from electronic data, comprising:

receiving the electronic data, the electronic data including a plurality of characters;

analyzing the characters of the electronic data to identify a group of characters;

determining whether the group of characters corresponds to a concept by comparing the group of characters to an entry in a hash table;

if the group of characters corresponds to the concept, then determining whether the concept is associated with an object;

if the concept is associated with an object, then propagating the concept through an active concept netwvork (ACN);

using the ACN to determine whether all conditions for the IOV are satisfied; and if all conditions for the IOV are satisfied, then identifying the IOV.

14. The method of claim 13, wherein propagating the concept through an active concept network (ACN), comprises:

notifying the object.

15. The method of claim 14, wherein the object corresponds to a co-implies relationship for the concept and a second concept, further comprising:

if the object is notified by the concept and the second concept, then determining that a third concept co-implied by the concept and the second concept is present in the electronic data.

16. The method of claim 13, wherein the conditions for the IOV include the presence of the concept and a second concept in the electronic data, and wherein using the ACN to determine whether all conditions for the IOV are satisfied, comprises:

determining whether the concept and the second concept are present in the electronic data.

17. The method of claim 13, wherein propagating the concept through an active concept network (ACN), comprises:

if the concept is associated with a null concept, then terminating processing of the concept.

18. The method of claim 13, wherein the hash table includes a plurality of entries, each entry corresponding to a concept.

19. The method of claim 13, further comprising:

if the group of characters does not correspond to any of the concepts in the hash table, then determining that the group of characters is an unprocessed term.

20. The method of claim 13, wherein the electronic data includes a document.

21. The method of claim 13, wherein the IOV includes a scope parameter and wherein the scope parameter specifies that the concept and a second concept are within a predetermined distance.

22. The method of claim 13, wherein analyzing the characters of the electronic data to identify a group of characters, comprises:

combining a first group of characters and a second group of characters with a hyphen.

23. The method of claim 13, further comprising:

analyzing the characters of the electronic data to identify a second group of characters;

determining whether the second group of characters corresponds to a second concept by comparing the second group of characters to a second entry in the hash table;

if the second group of characters corresponds to the second concept, then determining whether the second concept is associated with a second object; and if the second concept is associated with the second object, then propagating the second concept through the ACN.

24. The method of claim 23, wherein propagating the second concept through the Can, comprises:

notifying the second object.

25. The method of claim 13, further comprising:

using the ACN to determine whether all conditions for a second IOV are satisfied, wherein using the ACN to determine whether all conditions for the IOV are satisfied and using the ACN to determine whether all conditions for a second IOV are satisfied occur simultaneously.

26. A method for identifying information of value (IOV), comprising:

monitoring electronic data, the electronic data having a plurality of bits;

analyzing the bits from the electronic data to identify a string;

determining whether the string corresponds to a concept by comparing the string to an entry in a hash table;

if the string corresponds to the concept, then determining whether the concept is associated with an object;

if the concept is associated with an object, then notifying the object;

determining whether all conditions for the IOV are satisfied; and if all conditions for the IOV are satisfied, then identifying the IOV.

27. The method of claim 26, wherein the electronic data includes a graphic image.

28. The method of claim 26, wherein the electronic data includes audio.

29. The method of claim 26, wherein the electronic data includes a document.

30. The method of claim 26, wherein determining whether all conditions for the IOV are satisfied comprises:
   determining whether the concept and a second concept are present in the electronic data.

31. The method of claim 30, wherein the IOV includes a scope parameter and wherein the scope parameter specifies that the concept and the second concept are within a predetermined distance.

32. The method of claim 26, further comprising:
   if the object is associated with a second object, then notifying the second object.

33. The method of claim 26, wherein the object corresponds to a co-implies relationship for the concept and a second concept, comprising:
   if the object is notified by the concept and the second concept, then determining that a third concept co-implied by the concept and the second concept is present in the electronic data.

34. The method of claim 26, further comprising:
   if the concept is associated with a null concept, then terminating processing of the concept.

35. The method of claim 26, further comprising:
   analyzing the bits from the electronic data to identify a second string;
   determining whether the second string corresponds to a second concept by comparing the second string to a second entry in the hash table;
   if the second string corresponds to the second concept, then determining whether the second concept is associated with a second object; and
   if the second concept is associated with the second object, then notifying the second object.

36. The method of claim 26, wherein the hash table includes a plurality of entries, each entry corresponding to a concept.

37. The method of claim 26, further comprising:
   determining whether all conditions for a second IOV are satisfied, wherein determining whether all conditions for the IOV are satisfied and determining whether all conditions for the second IOV are satisfied occur simultaneously.

38. A method for identifying information of value (IOV), comprising:
   monitoring electronic data, the electronic data having a plurality of bits;
   analyzing the bits from the electronic data to identify a string;
   determining whether the string corresponds to a concept by comparing the string to an entry in a hash table;
   if the string corresponds to the concept, then propagating the concept through an active concept network (ACN);
   using the ACN to determine whether all conditions for a first IOV are satisfied;
   if all conditions for the first IOV are satisfied, then identifying the first IOV;
   using the ACN to determine whether all conditions for a second IOV are satisfied; and
   if all conditions for the second IOV are satisfied, then identifying the second IOV.

39. The method of claim 38, wherein using the ACN to determine whether all conditions for a first IOV are satisfied and using the ACN to determine whether all conditions for a second IOV are satisfied occur simultaneously.

40. The method of claim 38, wherein the electronic data includes a graphic image.

41. The method of claim 38, wherein the electronic data includes audio.

42. The method of claim 38, wherein the electronic data includes a document.

43. The method of claim 38, wherein propagating the concept through an active concept network (ACN), comprises:
   if the concept is associated with an object, then notifying the object.

44. The method of claim 38, wherein the hash table includes a plurality of entries, each entry corresponding to a concept.

45. The method of claim 38, wherein using the ACN to determine whether all conditions for a first IOV are satisfied comprises:
   determining whether the concept and a second concept are present in the electronic data.

46. The method of claim 45, wherein the first IOV includes a scope parameter and wherein the scope parameter specifies that the concept and the second concept are within a predetermined distance.

47. The method of claim 43, wherein the object corresponds to a co-implies relationship for the concept and a second concept, comprising:
   if the object is notified by the concept and the second concept, then determining that a third concept co-implied by the concept and the second concept is present in the electronic data.

48. The method of claim 38, further comprising:
   if the concept is associated with a null concept, then terminating processing of the concept.

49. The method of claim 38, further comprising:
   analyzing the bits from the electronic data to identify a second string;
   determining whether the second string corresponds to a second concept by comparing the second string to a second entry in the hash table; and
   if the second string corresponds to the second concept, then propagating the second concept through the ACN.

50. The method of claim 49, wherein propagating the second concept through the ACN comprises:
   notifying the second object.

* * * * *